(12) United States Patent
Hatanaka et al.

(10) Patent No.: US 7,344,291 B2
(45) Date of Patent: Mar. 18, 2008

(54) ILLUMINATING DEVICE AND BACKLIGHT DEVICE EMPLOYING THE ILLUMINATING DEVICE

(75) Inventors: Masato Hatanaka, Saitama (JP); Takeo Arai, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/576,235

(22) PCT Filed: Nov. 30, 2004

(86) PCT No.: PCT/JP2004/017805

§ 371 (c)(1),
(2), (4) Date: Apr. 14, 2006

(87) PCT Pub. No.: WO2005/057083

PCT Pub. Date: Jun. 23, 2005

(65) Prior Publication Data

US 2007/0064417 A1    Mar. 22, 2007

(30) Foreign Application Priority Data

Dec. 15, 2003   (JP) .............................. 2003-417337

(51) Int. Cl.
*F21V 7/04*  (2006.01)
*F21V 8/00*  (2006.01)

(52) U.S. Cl. ..................... 362/610; 362/19; 362/606; 362/231; 362/235; 362/241; 362/242; 362/268; 362/601; 362/800; 359/642; 349/65; 353/31; 353/98; 353/20; 353/122; 313/110

(58) Field of Classification Search ...................... None
See application file for complete search history.

(56) References Cited

U.S. PATENT DOCUMENTS 4,573,766 A * 3/1986 Bournay et al. .............. 349/65

(Continued)

FOREIGN PATENT DOCUMENTS

JP        63-182628        7/1988

(Continued)

*Primary Examiner*—Sandra O'Shea
*Assistant Examiner*—Danielle Dunn
(74) *Attorney, Agent, or Firm*—Robert J. Depke; Rockey, Depke & Lyons, LLC.

(57) ABSTRACT

Disclosed is an illuminating device which, as a light source for a backlight device, mixes the colors of light rays of three prime colors radiated by light emitting diodes to emit white light. The illuminating device includes a first light source (22R) radiating light rays of the first prime color, a second light source (22G) radiating light rays of the second prime color, a third light source (22B) radiating light rays of the third prime color, optical units (23R), (23G) and (23B) which refract divergent light rays contained in the light rays of the first prime color, emitted by the first light source (22R), the light rays of the second prime color, emitted by the second light source (22G) and in the light rays of the third prime color, emitted by the third light source (22B), to form collimated light rays, and triangular prisms (24) and (25) or a dichroic prism (26) mixing the light rays of the first, second and third prime colors, emitted by these optical units, by selective transmission and reflection, based on optical properties of the light rays of the respective prime colors.

60 Claims, 18 Drawing Sheets

U.S. PATENT DOCUMENTS

| | | | |
|---|---|---|---|
| 6,092,901 A * | 7/2000 | Hashizume et al. | 362/19 |
| 6,164,789 A | 12/2000 | Unger et al. | |
| 6,220,714 B1 * | 4/2001 | Eguchi | 353/122 |
| 6,224,216 B1 * | 5/2001 | Parker et al. | 353/31 |
| 6,547,400 B1 * | 4/2003 | Yokoyama | 353/98 |
| 7,070,281 B2 * | 7/2006 | Kato | 353/20 |
| 2004/0004424 A1 * | 1/2004 | Sakurai | 313/110 |

FOREIGN PATENT DOCUMENTS

| | | |
|---|---|---|
| JP | 08-076703 | 3/1996 |
| JP | 2002-260427 | 9/2002 |
| JP | 2003-187623 | 7/2003 |
| JP | 2003-215349 | 7/2003 |
| JP | 2003-330109 | 11/2003 |

* cited by examiner

ILLUMINATING DEVICE AND BACKLIGHT DEVICE EMPLOYING THE ILLUMINATING DEVICE

This application is a 371 U.S. National Stage filing of PCT/JP2004/017805, filed Nov. 30, 2004, which claims priority to Japanese Patent Application Number 2003-417337, filed Dec. 15, 2003, which are incorporated herein by reference.

TECHNICAL FIELD

This invention relates to a backlight device for a liquid crystal display (LCD). More particularly, this invention relates to an illuminating device, used as a light source for a backlight device, and the backlight device employing this illuminating device.

The present invention contains subject matter related to Japanese Patent Application JP 2003-417337 filed in the Japanese Patent Office on Dec. 15, 2003, the entire contents of which being incorporated herein by reference.

BACKGROUND ART

A backlight unit, forming a backlight device of a liquid crystal display, is mainly composed of light sources and a light guide plate for guiding light rays emitted from the light sources to radiate the light rays with in-plane light radiation. The light rays emitted by the light sources are guided from a lateral surface into the bulk of the light guide plate and emitted from one of the major surfaces of the light guide plate by in-plane light radiation to illuminate a liquid crystal display panel. The illuminating light rays, emitted by in-plane light radiation from the light guide plate, are the light rays transmitted through a light diffusing sheet or a lens sheet, provided to the backlight unit, so that uniform in-plane light radiation may be achieved on the entire surface of the liquid crystal display panel.

As the light sources for the backlight unit, fluorescent tubes or light emitting diodes (LEDs), for example, are used. In particular, the light emitting diodes are used as light sources mounted to electronic equipment which are small-sized and of a thin thickness. For example, in a backlight device of a liquid crystal display panel, with a size on the order of several inches, mounted on a portable small-sized electronic apparatus, such as a mobile phone, PDA (Personal Digital Assistant) or a digital camera, chip type white light emitting diodes, are used as light sources.

In a backlight device for illuminating a liquid crystal display panel of a large format, such as a display for a PC (Personal Computer) or for a television receiver, phosphorescent lamps, such as CCFLs (Cold Cathode Fluorescent Lamps), are used as light sources.

The CCFL (Cold Cathode Fluorescent Lamp) suffers a problem that it is inferior in power consumption or useful life to the LED, or that it may have undesirable influences on global environments due to use of mercury as a gas sealed therein.

Hence, there has been made a proposal which resides in using light emitting diodes as light sources for a backlight unit illuminating a liquid crystal display of a large format, such as a display for a PC or a television receiver. The light sources for the backlight must generate white light. However, the white color emitting diodes, used as light sources for the backlight unit, illuminating the liquid crystal panel of a small format, are designed to yield white light by a phosphorescent material coated on the blue light emitting diode. These white color emitting diodes are inferior to the CCFLs in the light emitting efficiency by approximately ⅙ pr 1/10, and hence are difficult to use for a liquid crystal display of the large format.

Consequently, there has also been made a proposal which resides in using light emitting diodes, respectively emitting three prime colors of light, namely red, green and blue light rays, and in mixing these red, green and blue colors, emitted from the light emitting diodes, to yield the white color light. By using three light emitting diodes for yielding the white light, sufficient luminance may be assured, while deterioration in the light emitting efficiency may be lower than with the aforementioned white light emitting diodes.

Referring to FIG. 19, a backlight unit 110, employing light emitting diodes 111R, 111G and 111B, emitting red, green and blue light rays, respectively, as light sources, and which is configured for illuminating a transmission type liquid crystal display panel 120 with in-plane light radiation, will now be explained. It is noted that, if the light emitting diodes 111R, 111G and 111B need not be distinguished from one another, they are collectively referred to as light emitting diodes 111.

The backlight unit 110 includes the light emitting diodes 111R, 111G and 111B, as light sources, a light guide plate 112, guiding the light emitted by the light sources, a light diffusing sheet 113, a first lens sheet 114 and a second lens sheet 115. The light diffusing sheet and the first and second lens sheets are layered in this order sequentially on a light radiating surface of the light guide plate 112.

In FIG. 19, only one each of the light emitting diodes 111R, 111G and 111B is shown. However, in actuality, there are provided a number of the sets of light emitting diodes, which is matched to the size of the liquid crystal display panel 120 adapted for in-plane light emission and illumination.

The light emitting diodes 111R, 111G and 111B, as light sources of the backlight unit 110, emit red light rays Lr, green light rays Lg and blue light rays Lb, respectively. The red light rays Lr, green light rays Lg and blue light rays Lb, emitted by the light emitting diodes 111R, 111G and 111B, respectively, undergo spontaneous color mixing by passing through a light guide path 116 and a light reflecting path 117 to then fall on the light guide plate 112 as white light. The light guide path 116 and the light reflecting path 117 are provided for affording a spacing necessary for the red light rays Lr, green light rays Lg and blue light rays Lb, emitted by the light emitting diodes 111R, 111G and 111B, respectively, to be mixed in color by spontaneous color mixing.

FIG. 20 depicts a cross-section taken along line A-A shown in FIG. 19. Referring to FIG. 20, the spacing necessary for the red light rays Lr, green light rays Lg and blue light rays Lb to be mixed in color by spontaneous color mixing is prescribed by adequately setting the width of the light guide path 116 and/or the radius R of the light reflecting path 117. The light guide path 116 and the light reflecting path 117 are formed of a material having a refractive index necessary for efficiently guiding the incident light rays to the light guide plate 112.

The white light, incident on the light guide plate 112, is guided through the bulk of the light guide plate 112 as it undergoes total reflection therein. On a light reflecting surface 112b of the light guide plate 112, there are formed prism patterns and/or dot patterns for efficiently changing the proceeding direction of the incident light to a direction towards an inner light radiating surface 112c. The light rays incident on the inner light radiating surface 112c with an angle of incidence less than a critical angle of incidence are emitted by these patterns from the inner light radiating surface 112c.

The light rays, emitted from the light radiating surface 112c, suffer from significant variations in the in-plane light volume distribution. Consequently, these light rays are caused to be incident on the light diffusing sheet 113 in order to be equalized in the in-plane light volume distribution. The light rays, radiated from the light diffusing sheet 113, are incident on the first lens sheet 114 and the second lens sheet 115 and thereby deflected to proceed in a direction corresponding to the direction of a normal line to the light radiating surface 112c.

By causing the light rays, emitted by the light radiating surface 112c of the light guide plate 112 and traversing the light diffusing sheet 113, to pass through the first lens sheet 114 and the second lens sheet 115, the front side luminance of the backlight unit 110 may be improved efficiently.

Meanwhile, a backlight device, having light emitting diodes, emitting red, green and blue light rays, as light sources, and which is different than the backlight unit 110 explained with reference to FIGS. 19 and 20, has been described in each of the JP Utility Model Publication Hei7-36347 and JP Patent Publication Kohyo 2002-540458.

In the backlight unit 110, shown in FIGS. 19 and 20, the light guide path 116 and the light reflecting path 117 are provided in such a manner as to increase the thickness of the light guide plate 112, in order to provide for spontaneous color mixing of red, green and blue colors, emitted from the light emitting diodes 111.

Thus, if the backlight unit 110 is mounted to the liquid crystal display panel 120 to form the liquid crystal display, the display is increased appreciably in thickness.

In case the illuminating device uses light emitting diodes, emitting light rays of three prime colors, that is, red light rays, green light rays and blue light rays, as light sources for the backlight unit illuminating a liquid crystal display panel of a large format, and the three colors are mixed together to form white light, it is necessary to increase the number of the illuminating devices in use in order to provide for desired luminance in keeping with the increase in size of the liquid crystal display panel. Hence, there is raised a demand for lowering the cost of each illuminating device and for elevating the light utilization efficiency.

Concomitantly, a there is raised a demand for willfully using an inexpensive light emitting diode, exhibiting variations in characteristics, instead of an expensive light emitting diode. However, if such inexpensive light emitting diode is used, it is not possible with the state-of-the-art illuminating device to produce the white light of high color purity.

DISCLOSURE OF THE INVENTION

Problems to be Solved by the Invention

It is an object of the present invention to provide a novel illuminating device with which the aforementioned problems of the conventional technique may be removed, and a backlight device employing this illuminating device.

It is another object of the present invention to provide a novel illuminating device which operates as a light source for a backlight device, employing light emitting diodes emitting red, green and blue light rays, respectively, which is inexpensive and of high efficiency, and which may emit white light of high color purity by color mixing, and a backlight device which realizes a thin display thickness with the use of the illuminating device.

The present invention provides an illuminating device comprising a first light source for radiating light rays of a first prime color, a second light source for radiating light rays of a second prime color, a third light source for radiating light rays of a third prime color, optical means for refracting divergent light rays, contained in the light rays of the first prime color, radiated from the first light source, the light rays of the second prime color, radiated from the second light source and in the light rays of the third prime color, radiated from the third light source, to collimate the divergent light rays, and color mixing means for color mixing the light rays of the first prime color, the light rays of the second prime color and the light rays of the third prime color, radiated from the optical means, by selective transmission and reflection, based on optical properties of the light rays of the respective prime colors, to form white light.

The present invention also provides an illuminating device comprising a first light source for radiating light rays of a first prime color, a second light source for radiating light rays of a second prime color, a third light source for radiating light rays of a third prime color, a first lens for refracting divergent light rays contained in the light rays of the first prime color radiated from the first light source to form collimated light rays, a second lens for refracting divergent light rays contained in the light rays of the second prime color radiated from the second light source to form collimated light rays, a third lens for refracting divergent light rays contained in the light rays of the third prime color radiated from the third light source to form collimated light rays, a first triangular prism having a first light reflecting surface for reflecting the light rays of the first prime color radiated via the first lens, a second triangular prism having a second light reflecting surface for reflecting the light rays of the second prime color radiated via the second lens, and a dichroic prism having a first wavelength selecting transmitting/reflecting surface and a second wavelength selecting transmitting/reflecting surface, which first and second wavelength selecting transmitting/reflecting surface are arranged for intersecting each other in the configuration of a letter X. The first wavelength selecting transmitting/reflecting surface transmits the light rays of the third prime color radiated via the third lens and reflects the light rays of the first prime color reflected by the first light reflecting surface of the first triangular prism, whilst the second wavelength selecting transmitting/reflecting surface transmits the light rays of the third prime color radiated via the third lens and reflects the light rays of the second prime color reflected by the second light reflecting surface of the second triangular prism. The dichroic prism mixes the light rays of the first to third prime colors to form white light, and radiates the so formed white light. The dichroic prism, the first triangular prism and the second triangular prism are arranged close to one another with the interposition of an air layer.

The present invention also provides an illuminating device comprising a first light source radiating light rays of a first prime color, a second light source radiating light rays of a second prime color, a third light source radiating light rays of a third prime color, a fourth light source radiating light rays of the third prime color, a first lens diffracting divergent light rays contained in the light rays of the first prime color radiated from the first light source to form collimated light, a second lens diffracting divergent light rays contained in the light rays of the second prime color radiated from the second light source to form collimated light, a third lens diffracting divergent light rays contained in the light rays of the third prime color radiated from the third light source to form collimated light, a fourth lens diffracting divergent light rays contained in the light rays of the third prime color radiated from the fourth light source to form collimated light, a first triangular prism having a first light reflecting surface for reflecting the light rays of the first prime color radiated via the first lens, a second triangular prism having a second light reflecting surface for reflecting the light rays of the second prime color radiated via the second lens, and a first beam splitter prism including a first transmitting/reflecting surface and a second transmitting/reflecting surface. The first transmitting/reflecting surface reflects linear polarized light oscillating in a first plane of oscillations of the light rays of the first prime color reflected by the first light reflecting surface, transmits linear polarized light oscillating in a second plane of oscillations perpendicular to the first plane of oscillations, and transmits linear polarized light oscillating in the first plane of oscillations of the light rays of the third prime color radiated via the third lens and linear polarized light oscillating in the second plane of oscillations. The second transmitting/reflecting surface transmits the light rays of the first prime color, reflects linear polarized light oscillating in the first plane of oscillations of the light rays of the second prime color, and transmits linear polarized light oscillating in the first plane of oscillations of the light rays of the third prime color radiated via the third lens and linear polarized light oscillating in the second plane of oscillations. The first and second transmitting/reflecting surfaces are arranged for intersecting each other in the configuration of a letter X. The illuminating device further comprises a second beam splitter prism including a third transmitting/reflecting surface and a fourth transmitting/reflecting surface. The third transmitting/reflecting surface reflects linear polarized light oscillating in a first plane of oscillations of the light rays of the second prime color reflected by the second light reflecting surface, transmits linear polarized light oscillating in the second plane of oscillations, and transmits linear polarized light oscillating in the first plane of oscillations of the light rays of the third prime color radiated via the fourth lens and linear polarized light oscillating in the second plane of oscillations. The fourth transmitting/reflecting surface transmits the light rays of the second prime color, reflects linear polarized light oscillating in the first plane of oscillations of the light rays of the first prime color, and transmits linear polarized light oscillating in the first plane of oscillations of the light rays of the third prime color radiated via the fourth lens and linear polarized light oscillating in the second plane of oscillations. The first and second transmitting/reflecting surfaces are arranged for intersecting each other in the configuration of a letter X. The illuminating device additionally comprises a wavelength plate arranged between the first beam splitter prism and the second beam splitter prism for converting linear polarized light oscillating in the second plane of oscillations of the light rays of the first prime color transmitted through the first transmitting/reflecting surface into linear polarized light oscillating in the first plane of oscillations and for converting linear polarized light oscillating in the second plane of oscillations of the light rays of the second prime color transmitted through the third transmitting/reflecting surface into linear polarized light oscillating in the first plane of oscillations.

The first beam splitter prism and the first triangular prism are arranged close to each other via an air layer, while the second beam splitter prism and the second triangular prism are arranged close to each other via an air layer and the first beam splitter prism and the second beam splitter prism are arranged close to each other via the wavelength plate and an air layer. The first beam splitter prism mixes linear polarized light oscillating in respective first planes of oscillations of the light rays of the first and second prime colors and linear polarized light rays oscillating in the first plane of oscillations and the second plane of oscillations of the light rays of the third prime color to form white color, and radiates the so formed white color. The second beam splitter prism mixes linear polarized light rays oscillating in respective first planes of oscillations of the light rays of the first and second prime colors and linear polarized light oscillating in the first plane of oscillations and the second plane of oscillations of the light rays of the third prime color to form white color, and radiates the so formed white color.

The present invention also provides an illuminating device comprising a first light source radiating light rays of a first prime color, a second light source radiating light rays of a second prime color, a third light source radiating light rays of a third prime color, a first lens diffracting divergent light rays contained in the light rays of the first prime color radiated from the first light source to form collimated light, a second lens diffracting the divergent light rays contained in the light rays of the second prime color radiated from the second light source to form collimated light, a third lens diffracting divergent light rays contained in the light rays of the third prime color radiated from the third light source to form collimated light, a first reflecting plate having a light reflecting surface reflecting the light rays of the first prime color radiated via the first lens, a first beam splitter plate having a first wavelength for selecting transmitting/reflecting surface for transmitting the light rays of the first prime color reflected by the light reflecting surface of the first reflecting plate and for reflecting the light rays of the second prime color radiated through the second lens, and a second beam splitter plate having a second wavelength selecting transmitting/reflecting surface for transmitting the light rays of the third prime color radiated via the third lens and for reflecting the light rays of the first prime color and the second prime color radiated via the first beam splitter plate. The second beam splitter plate mixes the light rays of the first, second and third colors to form white light. The illuminating device further comprises an optical plate having an angle selecting transmitting/reflecting surface having angle of incidence dependency of reflecting light incident at an angle not less than a preset angle of incidence and transmitting light incident at an angle less than the preset angle of incidence. The optical plate is arranged downstream of the second beam splitter plate so as to traverse an optical axis formed by the third lens and the second beam splitter plate and is adapted for radiating the white light obtained by color mixing by the second beam splitter plate.

The present invention also provides a backlight device including a light guide plate guiding the light rays incident thereon from a light incident surface thereof as the light rays undergo total reflection on a light radiating surface and on a light reflecting surface as one and the other of the major surfaces of the light guide plate, with the light guide surface radiating the light rays by in-plane light radiation from the light radiating surface, in which the backlight device comprises a plurality of illuminating devices provided at a preset interval on the light incident surface side of the light guide plate. The illuminating devices each include a first light source for radiating light rays of a first prime color, a second light source for radiating light rays of a second prime color, a third light source for radiating light rays of a third prime color, optical means for refracting divergent light rays, contained in the light rays of the first prime color, radiated from the first light source, the light rays of the second prime color, radiated from the second light source and in the light rays of the third prime color, radiated from the third light source, to collimate the divergent light rays, and color mixing means for color mixing the light rays of the first prime color, the light rays of the second prime color and the light rays of the third prime color, radiated from the optical means, by selective transmission and reflection, based on optical properties of the light rays of the respective prime colors, and for radiating the mixed light rays as white light.

The present invention also provides a backlight device including a light guide plate guiding the light rays incident thereon from a light incident surface thereof as the light rays undergo total reflection on a light radiating surface and on a light reflecting surface as one and the other of the major surfaces of the light guide plate, the light guide surface radiating the light rays by in-plane light radiation from the light radiating surface, in which the backlight device comprises a plurality of illuminating devices provided at a preset interval on the light incident surface side of the light guide plate. The illuminating devices each include a first light source for radiating light rays of a first prime color, a second light source for radiating light rays of a second prime color, a third light source for radiating light rays of a third prime color, a first lens for refracting divergent light rays contained in the light rays of the first prime color radiated from the first light source, a second lens for refracting divergent light rays contained in the light rays of the second prime color radiated from the second light source, a third lens for refracting divergent light rays contained in the light rays of the third prime color radiated from the third light source, a first triangular prism having a first light reflecting surface for reflecting the light rays of the first prime color radiated from the first lens, a second triangular prism having a second light reflecting surface for reflecting the light rays of the second prime color radiated from the second lens, and a dichroic prism having a first wavelength selecting transmitting/reflecting surface and a second wavelength selecting transmitting/reflecting surface, arranged for intersecting each other in the configuration of a letter X. The first wavelength selecting transmitting/reflecting surface transmits the light rays of the third prime color radiated via the third lens and reflects the light rays of the first prime color reflected by the first light reflecting surface of the first triangular prism, whilst the second wavelength selecting transmitting/reflecting surface transmits the light rays of the third prime color radiated via the third lens and reflects the light rays of the second prime color reflected by the second light reflecting surface of the second triangular prism. The dichroic prism mixes the light rays of the first to third prime colors to form white light, and radiates the so formed white light. The dichroic prism, the first triangular prism and the second triangular prism are arranged close to one another with the interposition of an air layer.

The present invention also provides a backlight device including a light guide plate guiding the light rays incident thereon from a light incident surface thereof as the light rays undergo total reflection by a light radiating surface and by a light reflecting surface as one and the other of the major surfaces of the light guide plate, with the light guide surface radiating the light rays by in-plane light radiation from the light radiating surface, in which the backlight device comprises a plurality of illuminating devices provided at a preset interval on the light incident surface of the light guide plate. The illuminating devices each include a first light source for radiating light rays of a first prime color, a second light source for radiating light rays of a second prime color, a third light source for radiating light rays of a third prime color, a fourth light source for radiating light rays of the third prime color, a first lens for refracting divergent light rays contained in the light rays of the first prime color radiated from the first light source, a second lens for refracting divergent light rays contained in the light rays of the second prime color radiated from the second light source, a third lens for refracting divergent light rays contained in the light rays of the third prime color radiated from the third light source, a fourth lens for refracting divergent light rays contained in the light rays of the third prime color radiated from the fourth light source, a first triangular prism having a first light reflecting surface for reflecting the light rays of the first prime color radiated from the first lens, a second triangular prism having a second light reflecting surface for reflecting the light rays of the second prime color radiated from the second lens, and a first beam splitter prism including a first transmitting/reflecting surface and a second transmitting/reflecting surface. The first transmitting/reflecting surface reflects linear polarized light oscillating in a first plane of oscillations of the light rays of the first prime color reflected by the first light reflecting surface, transmits linear polarized light oscillating in a second plane of oscillations perpendicular to the first plane of oscillations, transmits linear polarized light oscillating in the first plane of oscillations of the light rays of the third prime color radiated via the third lens and transmits linear polarized light oscillating in the second plane of oscillations. The second transmitting/reflecting surface transmits the light rays of the first prime color, reflects linear polarized light oscillating in the first plane of oscillations of the light rays of the second prime color, and transmits linear polarized light oscillating in the first plane of oscillations of the light rays of the third prime color radiated via the third lens and linear polarized light oscillating in the second plane of oscillations. The first and second transmitting/reflecting surfaces are arranged for intersecting each other in the configuration of a letter X. The illuminating device further includes a second beam splitter prism including a third transmitting/reflecting surface and a fourth transmitting/reflecting surface. The third transmitting/reflecting surface reflects linear polarized light oscillating in a first plane of oscillations of the light rays of the second prime color reflected by the second light reflecting surface, transmits linear polarized light oscillating in the second plane of oscillations, transmits linear polarized light oscillating in the first plane of oscillations of the light rays of the third prime color radiated via the fourth lens and transmits linear polarized light oscillating in the second plane of oscillations. The fourth transmitting/reflecting surface transmits the light rays of the second prime color, reflects linear polarized light oscillating in the first plane of oscillations of the light rays of the first prime color, and transmits linear polarized light oscillating in the first plane of oscillations of the light rays of the third prime color radiated via the fourth lens and linear polarized light oscillating in the second plane of oscillations. The third and fourth transmitting/reflecting surfaces are arranged for intersecting each other in the configuration of a letter X. The illuminating device additionally comprises a wavelength plate arranged between the first beam splitter prism and the second beam splitter prism for converting linear polarized light, oscillating in the second plane of oscillations of the light rays of the first prime color, transmitted through the first transmitting/reflecting surface, into linear polarized light oscillating in the first plane of oscillations, and for converting linear polarized light oscillating in the second plane of oscillations of the light rays of the second prime color transmitted through the third transmitting/reflecting surface into linear polarized light oscillating in the first plane of oscillations. The first beam splitter prism and the first triangular prism are arranged close to each other via an air layer, the second beam splitter prism and the second triangular prism are arranged close to each other via an air layer and the first beam splitter prism and the second beam splitter prism are arranged close to each other via the wavelength plate and an air layer. The first beam splitter prism mixes linear polarized light oscillating in respective first planes of oscillations of the light rays of the first and second prime colors and linear polarized light rays oscillating in the first plane of oscillations and the second plane of oscillations of the light rays of the third prime color to form white light, and radiates the so formed white light. The second beam splitter prism mixes linear polarized light rays oscillating in respective first planes of oscillations of the light rays of the first and second prime colors and linear polarized light oscillating in the first plane of oscillations and the second plane of oscillations of the light rays of the third prime color to form white color, and radiates the so formed white color.

The present invention also provides a backlight device including a light guide plate guiding the light rays incident from a light incident surface of the light guide plate as the light rays undergo total reflection by a light radiating surface and a light reflecting surface as one and the other of the major surfaces of the light guide plate, the light guide surface radiating the light rays by in-plane light radiation from the light radiating surface, in which the backlight device comprises a plurality of illuminating devices provided at a preset interval on the light incident surface side of the light guide plate. The illuminating devices each include a first light source for radiating light rays of a first prime color, a second light source for radiating light rays of a second prime color, a third light source for radiating light rays of a third prime color, a first lens for refracting divergent light rays contained in the light rays of the first prime color radiated from the first light source, a second lens for refracting divergent light rays contained in the light rays of the second prime color radiated from the second light source, a third lens for refracting divergent light rays contained in the light rays of the third prime color radiated from the third light source, a first reflecting plate having a light reflecting surface for reflecting the light rays of the first prime color radiated via the first lens, a first beam splitter plate having a first wavelength selecting transmitting/reflecting surface which transmits light rays of the first prime color reflected by the light reflecting surface possessed by the first reflecting plate and which reflects the light rays of the second prime color radiated via the second lens, a second beam splitter plate having a second wavelength selecting transmitting/reflecting surface which transmits light rays of the third prime color radiated via the third lens and which reflects light rays of the first and second prime colors, radiated via the first beam splitter plate, the second beam splitter plate mixing the light rays of the first, second and third prime colors to form white light, and an optical plate having an angle selecting transmitting/reflecting surface which reflects light rays incident thereon at an angle not less than a preset angle of incidence and which transmits light rays incident thereon at an angle less than the angle of incidence. The optical plate is arranged in rear of the second beam splitter plate so as to traverse an optical axis formed by the third lens and the second beam splitter plate. The optical plate radiates the white light obtained by color mixing by the second beam splitter plate.

According to the present invention, in which the white light may be obtained by mixing light rays of three prime colors, emitted by the light sources, the white light of high color purity may be emitted by in-plane light radiation on a liquid crystal display panel.

Moreover, according to the present invention, in which the light rays of three prime colors, emitted from the light sources with the tendency towards divergence, may be collimated, it is possible to suppress loss of light components which might otherwise be caused in the course of guiding the light rays through a stage previous to light mixing in the color mixing means, thus improving the utilization efficiency of light rays generated by the light sources.

Furthermore, the color mixing means mix the light rays of the three prime colors together by selective light transmission and reflection, based on the optical properties of the light rays of the three prime colors, to generate white light. Hence, the color purity of the white light, obtained by color mixing, may be improved even in case of using inexpensive light sources, exhibiting variations in characteristics, such as inexpensive light emitting diodes.

For example, in case a dichroic prism, a beam splitter prism or a beam splitter plate is used as color mixing means, and selective light transmission and reflection by a thin film formed on these optical components is carried out, it becomes possible to control the conditions for light transmission or light reflection by changing the film thickness or the material type of the thin film, which is to be formed, thus assuring facilitated adjustment for improving the color purity.

Even in case the light incident surface of the light guide plate is reduced significantly in thickness as compared to the white light radiating surface of the color mixing means, there is no risk of compromising the light utilization efficiency through the use of an optical component adapted for guiding the totality of white light rays radiated from the color mixing means to the light incident surface of the light guide plate.

In case a liquid crystal display panel, provided with color filters, is illuminated using a backlight device of the present invention, approximately 100 to 120% of the gamut of chromaticity of the NTSC (National Television System Committee) system in the CIE chromaticity diagram, may be reproduced. Hence, it becomes possible to cope with the range of color reproducibility of sYCC which is the color space with a color gamut wider than that of the NTSC system.

Other objects and specific advantages of the present invention will become more apparent from the following explanation of preferred embodiments thereof which will now be made with reference to the accompanying drawings.

BEST MODE FOR CARRYING OUT THE INVENTION

An illuminating device and a backlight device according to the present invention will now be explained in detail with reference to the drawings.

Initially, a backlight unit, that goes to make up the backlight device, embodying the present invention, will be explained.

Figure 1:
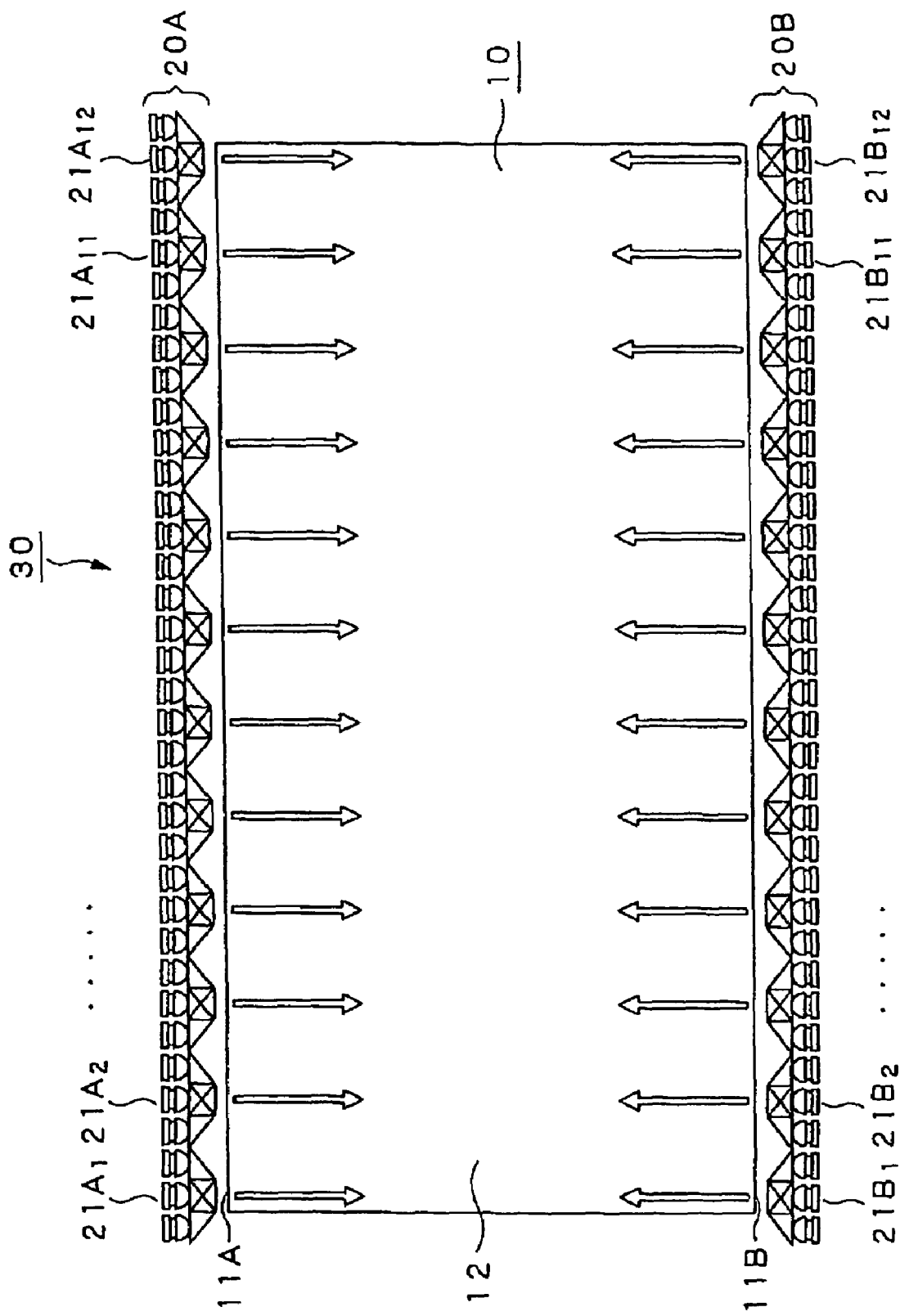
FIG. 1 is a front view of a backlight unit of the present invention, as viewed from a light radiating surface side.

Referring to FIG. 1, a backlight unit 30 includes at least a light guide plate 10, a light source unit 20A and a light source unit 20B. The backlight unit 30 forms a backlight device illuminating a light transmitting liquid crystal display panel of a large picture image format, such as a 17-inch size light transmitting liquid crystal display panel.

A light guide plate 10, shown in FIG. 1, is a transparent plate, having an aspect ratio of, for example, 9:16, and a predetermined thickness along the direction perpendicular to the plane of the drawing sheet. The size of the light guide plate 10 also is of, for example, a 17-inch size, in keeping with the 17-inch size liquid crystal display panel.

It should be noted that the size of the light guide plate 10 is determined by the size of the liquid crystal display panel, which is illuminated by the backlight unit 30, employing the light guide plate 10, and that the present invention is not limited to the particular size which is given herein only by way of illustration.

The material that makes up the light guide plate 10 may be enumerated by thermoplastic resins, exhibiting light transmitting properties, such as methacrylic resin, styrene resin or polycarbonate resin, in addition to acrylic resin. The light guide plate 10 is desirably formed of a synthetic resin material having a high degree of light transmitting properties, such as acrylic resin, and is prepared by injection molding this synthetic resin material. The light guide plate 10 guides the light, incident from light incident surfaces 11A and 11B, to radiate the so guided light from a light radiating surface 12 formed on one of its major surfaces.

A light reflecting surface 13, formed on the major surface of the light guide plate 10 opposite to the major surface carrying the aforementioned light radiating surface 12, is formed with fine indentations, such as prism patterns or dot patterns, for efficiently converting the direction of light guided within the light guide plate 10 to an upward direction towards the light radiating surface 12, although these indentations are not shown for simplifying the drawing. By the prism patterns or dot patterns, the light incident on the light guide plate 10 is radiated as uniform light from the light radiating surface 12, such that the light guide plate 10 radiates light by in-plane light radiation.

Referring to FIG. 1, the backlight unit 30 is provided with the light source units 20A, 20B for facing light incident surfaces 11A, 11B formed on both longitudinal side edges of the light guide plate 10. The light source units 20A, 20B are each provided with a plural number of illuminating devices 21A1 to 21A12 and 21B1 to 21B12, respectively. These illuminating devices are arrayed at preset intervals along the longitudinal direction of the light guide plate 10.

If, in the following explanation, there is no necessity of individually distinguishing the illuminating devices 21A1 to 21A12 and 21B1 to 21B12, making up the light source units 20A, 20B, respectively, these are collectively termed an illuminating device or illuminating devices.

The illuminating devices 21A1 to 21A12 of the light source unit 20A and the illuminating devices 21B1 to 21B12 of the light source unit 20B are all of the same structure, and are each provided with light emitting diodes, emitting light rays of three prime colors, that is, red, green and blue colors, and with color mixing means for mixing the light rays of red, green and blue colors, emitted from these light emitting diodes, to form the white light. The detailed structure of the illuminating device 21 will be explained later on.

The white light, obtained on color mixing by the illuminating devices 21A, 21B, are incident on the light guide plate 10, from light incident surfaces 11A, 11B of the light guide plate 10, and is guided as it is subjected to total reflection within this light guide plate 10. The so guided light is changed in its proceeding direction by the prism patterns or dot patterns, formed on the light reflecting surface 13, to an upward direction, so as to be radiated from the light radiating surface 12.

Figure 2:
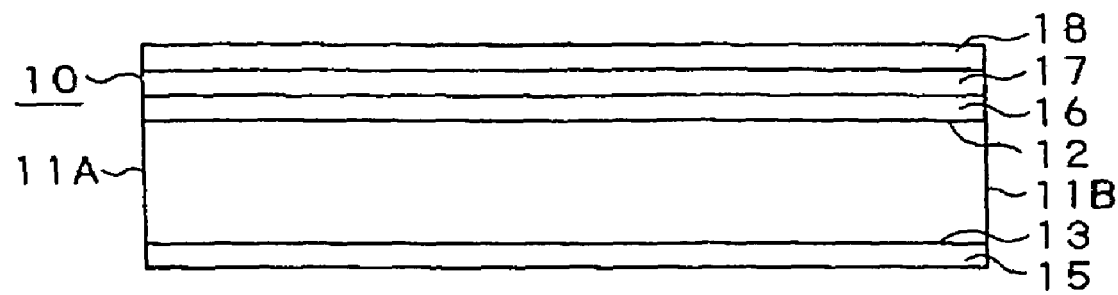
FIG. 2 is a cross-sectional view of a light guide plate of FIG. 1, forming the backlight unit, as seen from a light radiating surface side.

FIG. 2 shows the cross-section of the light guide plate 10, taken along line A-A of FIG. 1. A reflective sheet 15, not shown in FIG. 1, is bonded to the light reflecting surface 13 of the light guide plate 10, as shown in FIG. 2. On the light radiating surface 12 of the light guide plate, lying opposite to its light reflecting surface 13, a light diffusing sheet 16, a first lens sheet 17 and a second lens sheet 18 are sequentially layered, as shown in FIG. 2.

The light reflecting sheet 15 reflects the light, which is guided within the bulk of the light guide plate 10 as it undergoes total reflection, and which may otherwise pop out from the light reflecting surface 13 to outside the light guide plate 10, to return the light again into the bulk of the light guide plate 10. This suppresses light components which might otherwise be lost by popping outward from the light guide plate 10.

The light diffusing sheet 16 diffuses the light, radiated from the light radiating surface 12 of the light guide plate 10, to form uniform light. The first lens sheet 17 and the second lens sheet 18 operate for condensing the light radiated from the light diffusing sheet 16 towards the front side of the light guide plate 10.

The backlight unit 30 is able to acquire sufficient front side luminance by the light reflecting sheet 15, light diffusing sheet 16, first lens sheet 17 and the second lens sheet 18, arranged on the light guide plate 10.

The structure of the illuminating device 21 will now be explained. The illuminating device 21 uses a dichroic prism, having two wavelength selecting transmitting/reflecting surfaces which selectively transmit and reflect light rays depending on the difference in wavelengths, for operating as color mixing means for mixing red, green and blue light rays, emitted by the respective light emitting diodes, to form white light.

A wide variety of illuminating devices may be used as illuminating devices making up the light source units 20A, 20B used for the backlight unit 30 according to the present invention. Several examples of the illuminating devices, usable in the present invention, will now be explained below.

Figure 3:
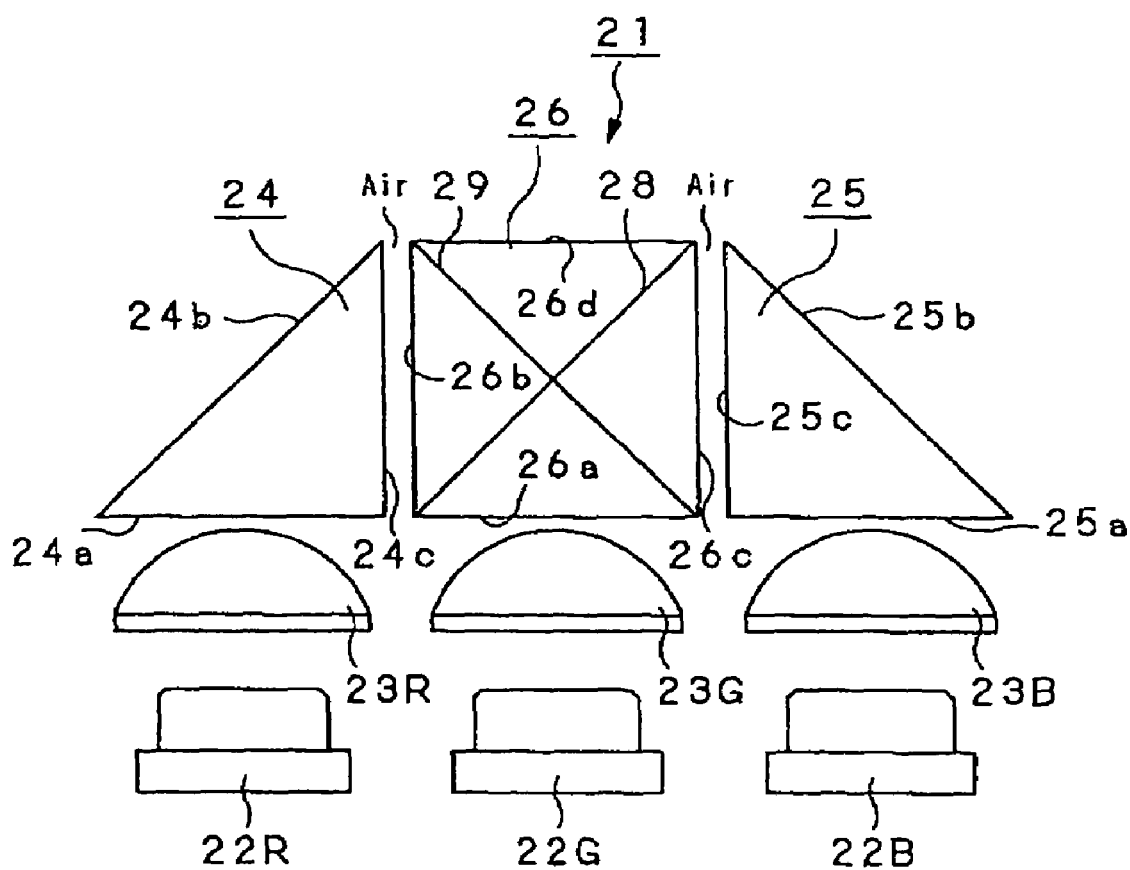
FIG. 3 is a front side view showing a backlight unit fitted with an illuminating device.

The illuminating device 21, as one of such illuminating devices, will now be explained. Referring to FIG. 3, the illuminating device 21 includes light emitting diodes 22R, 22G and 22B, light condensing lenses 23R, 23G and 23B, arranged on the light emitting surface sides of the light emitting diodes 22R, 22G and 22B, triangular prisms 24, 25 and a dichroic prism 26. The triangular prisms 24, 25 are arranged on the light radiating surface sides of the light condensing lenses 23R and 23B, respectively, while the dichroic prism 26 is arranged on the light radiating surface side of the light condensing lens 23G.

If, in the explanation to follow, there is no necessity for distinguishing the light emitting diodes 22R, 22G and 22B and the light condensing lenses 23R, 23G and 23B from one another, they are collectively referred to below as the light emitting diodes 22 and the light condensing lenses 23, respectively.

The dichroic prism 26 and the triangular prisms 24, 25 are arranged with the interposition of an air layer Air, in order to prevent them from having intimate contact with one another. Although the air layer Air is shown to an exaggerated scale in FIG. 3, it is, in actuality, a layer of a micrometric order in order to suppress the loss of the guided light to a minimum value. The air layer Air may be formed by placing beads of plastics materials, each with a diameter of the order of 0.5 µm, between the triangular prism 24 and the dichroic prism 26 and between the triangular prism 25 and the dichroic prism 26.

The triangular prisms 24, 25 and the dichroic prism 26 operate as color mixing means which is supplied via light condensing lenses 23 with light rays emitted by the light emitting diodes 22 and which then mixes the light rays to generate white light.

The light emitting diodes 22R, 22G and 22B emit light rays with wavelength ranges exhibiting red color, green color and blue color, respectively. Any suitable light emitting diodes, usable as the light emitting diodes 22R, 22G and 22B, may be used, provided that the above requirements are satisfied. For example, light emitting diodes with the shape of the high dome (High-Dome) type, shape of the low dome (Low Dome) type or the shape of the flat (Flat) type, specifying the directivity pattern of emitted light rays, may be used.

By way of examples, the design parameters of the light emitting diodes 22R, 22G and 22B, used for the illuminating device 21, are shown below:

Light emitting diode 22R: red color (color of emitted light), 625 nm (center wavelength), High-Dome type (shape) and 1 W (power consumption)

Light emitting diode 22G: green color (color of emitted light), 530 nm (center wavelength), High-Dome type (shape) and 3 W (power consumption)

Light emitting diode 22B: royal blue color (color of emitted light), 455 nm (center wavelength), High-Dome type (shape) and 3 W (power consumption)

The light condensing lenses 23R, 23G and 23B condense red, green and blue light rays, emitted from the light emitting diodes 22R, 22G and 22B, respectively, and cause the light rays to fall on the triangular prism 24, dichroic prism 26 and on the triangular prism 25, respectively. Since the red, green and blue light rays, emitted from the light emitting diodes 22R, 22G and 22B, respectively, are divergent light rays having directivity such that the light rays are diverged radially, the light condensing lenses 23R, 23G and 23B reflect the light rays to form collimated light. In actuality, an amount of the light which accounts for several percent of the totality of the light is not completely collimated and is radiated from the light condensing lenses 23R, 23G and 23B as light having a moderate divergent tendency.

By the light condensing lens 23 collimating the divergent light, emitted by the light emitting diode 22, the light rays, which otherwise may stray out of the triangular prisms 24, 25 and the dichroic prism 26 of the downstream side stage, where the light mixed together to form white color is guided through the respective prisms, may be suppressed from straying outwards from the respective prisms in a premixing stage. The result is the improved light exploitation efficiency of light radiated by the light emitting diodes 22.

The light condensing lens 23 is a spherical or an aspherical lens and may be formed of optical glass exemplified by BK-7 (trade name of a product manufactured by SCHOTT), NBFD13 (trade name of a product manufactured by HOYA) or SF11 (trade name of a product manufactured by SCHOTT).

The light condensing lens 23 may have its surface coated with an anti-reflection film (AR coating film) to lower the reflection from the lens surface to improve the transmittance. For example, the light condensing lens 23 may have its surface coated with a single-layer anti-reflection coating by $MgF_2$ or a multi-layer coating by a multi-layer dielectric film.

Figure 4:
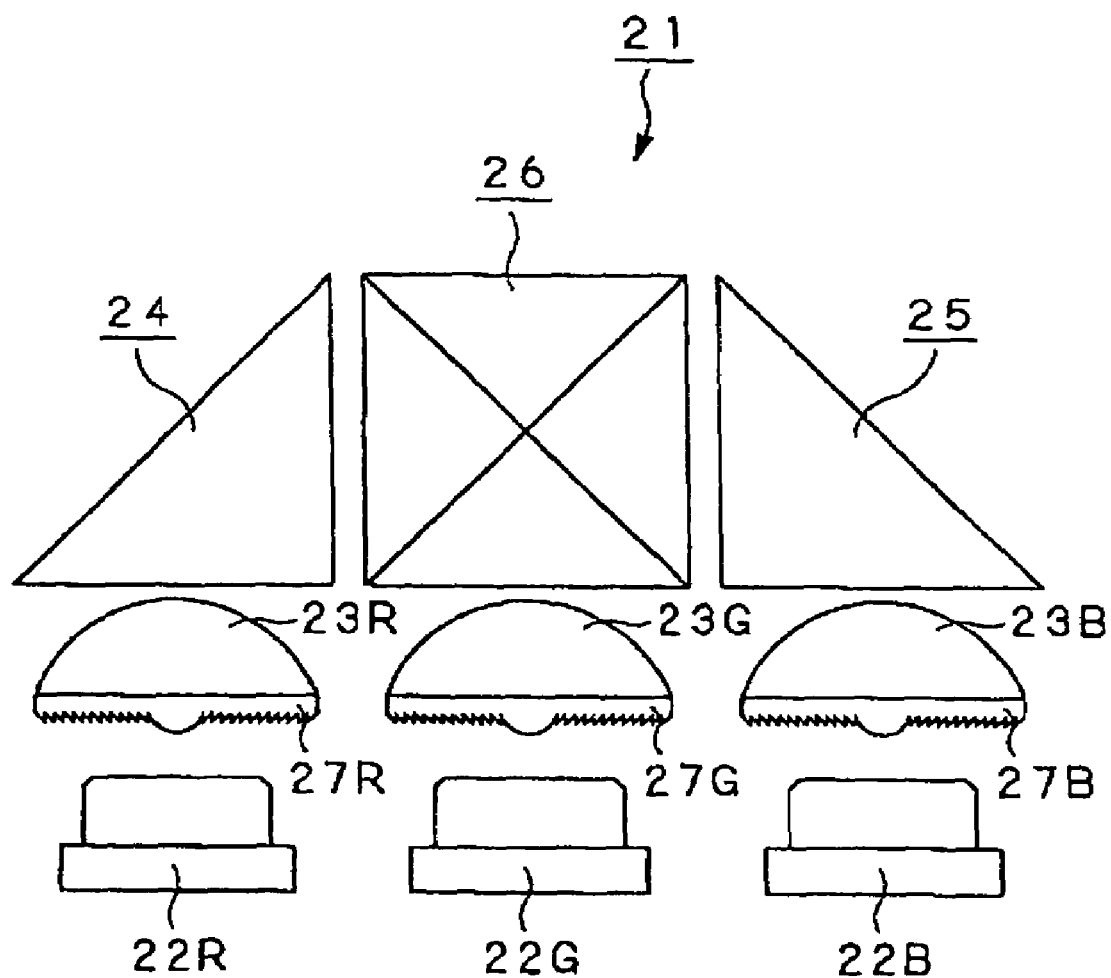
FIG. 4 is a front side view showing a backlight unit fitted with an illuminating device having a Fresnel lens.

On the light incident surface sides of the light condensing lenses 23R, 23G and 23B, there may be provided Fresnel lenses 27R, 27G and 27B as one with the light incident surfaces, as shown in FIG. 4. If the Fresnel lenses 27R, 27G and 27B need not be distinguished from one another, they are collectively referred to as Fresnel lenses 27.

The Fresnel lenses 27 are made up by plural concentrically-shaped prisms, formed in the form of plural ring-shaped steps, and are prepared by injection molding of acrylic resin. By arranging the Fresnel lenses 27 in a pre-stage of the light condensing lenses 23, the function of the light condensing lenses 23, that is, the function of refracting the divergent light to form collimated light, may be displayed efficaciously.

By arranging the Fresnel lenses 27 in the pre-stage of the light condensing lenses 23, as shown in FIG. 4, the light condensing lenses 23 are able to collimate the divergent light, without dependency upon whether the light condensing lenses 23 are spherical lenses or aspherical lenses. If the light condensing lenses 23 are aspherical lenses, and the Fresnel lenses 27 are used, the divergent light may be turned into collimated light more efficaciously.

If the Fresnel lenses 27 are used in this manner in combination with the light condensing lenses 23, the light condensing lenses 23 may be formed of an inexpensive polycarbonate resin, in place of an expensive optical glass. If, when the Fresnel lenses 27 are used in this manner in combination with the light condensing lenses 23, the light condensing lenses 23 are formed of the polycarbonate resin, it is possible to obtain the favorable effects which are equivalent to those in case of using only the light condensing lenses 23 formed of the optical glass.

The Fresnel lenses 27 may also be coated with the same anti-reflection films (AR coating films) as those provided to the light condensing lenses 23 to deteriorate the reflection from the lens surface and to elevate the transmittance.

The light condensing lenses 23 may also be formed as one with the Fresnel lenses 27 so that the Fresnel lenses will form light incident surfaces of the light condensing lenses. The Fresnel surfaces of the Fresnel lenses 27 may also be spherically-shaped or non-spherically shaped.

Reverting to FIG. 3, the structure of the illuminating device 21 will be explained. The triangular prisms 24, 25 are each a right-angled prism, having the bottom shaped as a right-angled isosceles triangle, and are provided on the light radiating face sides of the light condensing lenses 23R and 23B, respectively. Reflective films are formed on inclined surfaces 24b and 25b of the triangular prisms 24 and 25, respectively, and operate for reflecting or totally reflecting the light incident from the light incident surfaces 24a and 25a to guide the so reflected light to light radiating surfaces 24c and 25c, respectively.

For example, aluminum or silver may be vapor-deposited on the inclined surfaces 24b and 25b to form the reflective films. In case silver is vapor-deposited on the inclined surfaces 24b and 25b, protective films, such as SiO2 films, are vapor-deposited for preventing the oxidation of the vapor-deposited silver layers.

The dichroic prism 26 is a cubic-shaped prism, provided on the light radiating surface side of the light condensing lens 23G.

The dichroic prism 26 includes a first wavelength selecting transmitting/reflecting surface 28 and a second wavelength selecting transmitting/reflecting surface 29. The first wavelength selecting transmitting/reflecting surface transmits visible light of a wavelength not higher than that of green light emitted by the light emitting diode 22G and reflects the visible light of the other wavelength range, that is, the red light emitted by the light emitting diode 22R, whilst the second wavelength selecting transmitting/reflecting surface transmits visible light of a wavelength higher than that of green light and reflects the visible light of the other wavelength range, that is, the blue light emitted by the light emitting diode 22B. The first wavelength selecting transmitting/reflecting surface and the second wavelength selecting transmitting/reflecting surface are arranged to intersect each other in the form of a letter X.

The first and second wavelength selecting transmitting/reflecting surfaces 28, 29 of the dichroic prism 26 are multi-layer dielectric films, formed by thin film forming methods, such as vacuum deposition method or sputtering method. Hence, the wavelength range for light transmission and light reflection, that is, the cut-off wavelength range, may be freely controlled by forming the multi-layer dielectric films with variable material types or film thicknesses depending on, for example, the characteristics of the respective light emitting diodes 22 used.

For example, the wavelength range of the red light, emitted by the light emitting diode 22R, is partially overlapped with that of the green light, emitted by the light emitting diodes 22G, due to the difference in characteristics proper to the light emitting diodes used. The light in the overlapped wavelength range presents a color hue which may be perceived by a human eye to be neither a red color hue nor a green color hue. The same may be said of the green light and the blue light, for which case there is similarly an overlapped wavelength range.

In case the red light, green light and the blue light are mixed together to form white light, the light radiated from color filters of a liquid crystal display panel is lowered in color purity. This overlapping wavelength range may be cut off to elevate color purity significantly, even though the luminance is slightly lowered.

The light emission characteristics of the respective light emitting diodes 22 may be designed so that the wavelength ranges of the respective colors are not overlapped with one another. However, this entails marked costs. With the illuminating device 21, in which the color purity may be controlled by adjusting the multilayer dielectric films, making up the first wavelength selecting transmitting/reflecting surface 28 and the second wavelength selecting transmitting/reflecting surface 29 of the dichroic prism 26, it becomes possible to use inexpensive light emitting diodes, exhibiting variations in characteristics, as the light emitting diodes 22.

The dichroic prism 26 may also have its surface coated with an anti-reflection film (AR coating film), such as a dielectric multi-coating film, for lowering the reflection and for elevating the transmittance.

With this dichroic prism 26, the green light rays, emitted by the light emitting diode 22G and incident on the dichroic prism via light condensing lens 23G, are transmitted through the first and second wavelength selecting transmitting/reflecting surfaces 28 and 29.

Also, with the dichroic prism 26, the red light rays, emitted by the light emitting diode 22R and incident on the dichroic prism via light condensing lens 23R and triangular prism 24, are reflected by the first wavelength selecting transmitting/reflecting surface 28.

Moreover, the dichroic prism 26 reflects the blue light rays, emitted by the light emitting diode 22B and incident on the dichroic prism via light condensing lens 23R and triangular prism 25, by the second wavelength selecting transmitting/reflecting surface 29 to generate white light mixed from the green, red and blue light rays, to radiate the so generated white light.

The dichroic prism 26 and the triangular prisms 24, 25 being arranged with the interposition of an air layer Air in order to prevent them from intimately contacting with one another will now be explained. Since the effect of providing the air layer Air between the triangular prism 24 and the dichroic prism 26 may totally be identified with that of providing the air layer Air between the triangular prism 25 and the dichroic prism 26, the following explanation will be made only in connection with the triangular prism 24 and the dichroic prism 26.

Initially, the state in which the triangular prism 24 and the dichroic prism 26 are arranged in intimate contact with each other will be explained. In such case, a light component, incident on the light radiating surface 24c at an angle not less than the critical angle, is transmitted therethrough without undergoing total reflection by the light radiating surface 24c to enter the dichroic prism 26 from its light incident surface 26b. Since this light component is incident on the dichroic prism 26, as its angle of incidence not less than the critical angle is maintained, the light component is not incident on the first wavelength selecting transmitting/reflecting surface 28 and is radiated as red light from a light radiating surface 26d, thus lowering the light utilization efficiency.

Hence, if the triangular prism 24 and the dichroic prism 26 are arranged with the interposition of the air layer Air, as described above, and the red light rays, radiated from the light condensing lens 23R, are the completely collimated light, the light incident on the light incident surface 24a of the triangular prism 24 undergoes total reflection on the inclined surface 24b and is radiated in a direction perpendicular to the light radiating surface 24c to fall on the first wavelength selecting transmitting/reflecting surface 28 of the dichroic prism 26.

If the red light rays, radiated from the light condensing lens 23R, are not completely collimated and are incident on the light incident surface 24a of the triangular prism 24 with a slightly diverging tendency, the red light undergoes repeated total reflection and reflection, until it is radiated from the light radiating surface 24c. Of the light incident at this time on the light radiating surface 24c, the component incident with an angle exceeding the critical angle undergoes total reflection on the light radiating surface 24c and is reflected by the inclined surface 24b. The light reflected by the inclined surface 24b falls on the light incident surface 26b of the dichroic prism 26 and is incident without fail on the first wavelength selecting transmitting/reflecting surface 28 so as to be mixed with the white light radiated from the light radiating surface 26d. Consequently, the white light may be generated without compromising the light utilization efficiency, in distinction from the case where the dichroic prism 26 and the triangular prism 24 are intimately contacted with each other.

Meanwhile, with the tendency to reduce the thickness of the liquid crystal display, there is raised a demand for reducing the thickness of the backlight unit 30, that is, the thickness of the light guide plate 10.

However, the size of the illuminating device 21, formed by the light source units 20A and 20B, is approximately determined by the shape of the light emitting diodes 22, and the size of the radiating opening for radiating the white light obtained on color mixing, which is at least equal to an area of the light radiating surfaces 26d of the dichroic prisms 26, is required. Thus, if the thickness of the light guide plate 10 is to be adapted to the shape of the light radiating surfaces 26d, the light guide plate 10 cannot be reduced in thickness. If conversely the light guide plate 10 is reduced in thickness, the white light leaks out from the light radiating surfaces 26d because of shape incongruence, thus appreciably lowering the light utilization efficiency.

Figures 5A, 5B:
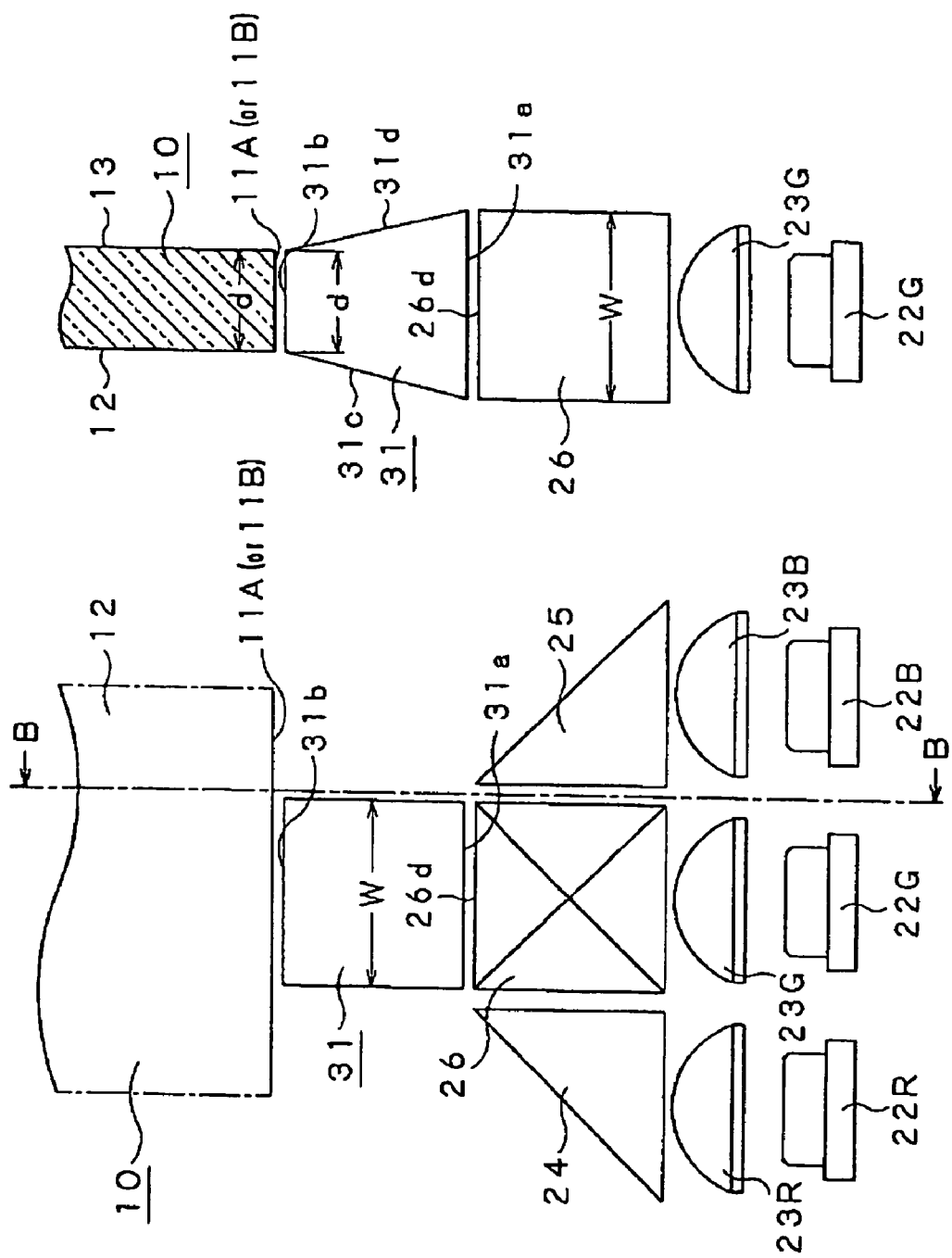
FIG. 5A is a front side view showing a backlight unit provided to an illuminating device added by an optical element.
FIG. 5B is a cross-sectional view taken along line A-A of FIG. 5A.

Referring to FIGS. 5A and 5B, the illuminating device 21 is provided with an optical component 31, between it and the light guide plate 10, as an adapter for matching the shape of the light radiating surfaces 26d of the dichroic prisms 26 to the thickness of the light guide plate 10.

FIG. 5A depicts a front side view of the light radiating surface 12 of the light guide plate 10, and FIG. 5B depicts a cross-sectional view taken along line B-B of FIG. 5A. The optical component 31 has a light incident surface 31a co-extensive as the light radiating surfaces 26d of the dichroic prisms 26. The optical component 31 has a light radiating surface 31b in the form of a rectangle having one side of a width W equal to the transverse width W of the dichroic prisms 26 shown in FIG. 5A and the opposite side of a width (thickness) d equal to a thickness d of the light guide plate 10 shown in FIG. 5B.

That is, the light radiating surface 31b of the optical component 31 is of an area smaller than the area of the light incident surface 31a, depending on the thickness of the light guide plate 10, while the optical component 31 is of a trapezoidal shape on the whole, tapering at a preset angle of taper from the light incident surface 31a.

Figure 6:
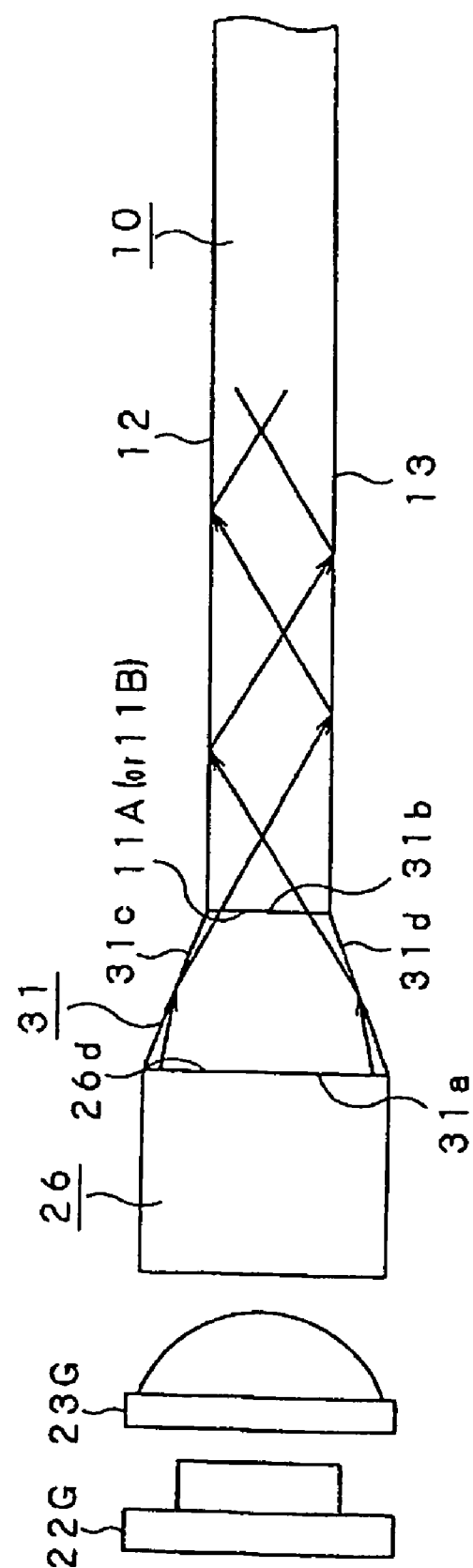
FIG. 6 is a side view showing an illuminating device added by an optical element.

Referring to FIG. 6, the white light, radiated from the light radiating surface 26d of the dichroic prism 26, falls on the light incident surface 31a of the optical component 31, and is guided as the light undergoes total reflection on angled light reflecting surfaces 31c, 31d thereof, until it is incident via light radiating surface 31b on the light incident surfaces 11B and 11A of the light guide plate 10.

Thus, the white light rays, totally reflected by the light reflecting surfaces 31c, 31d of the optical component 31 and radiated from the light radiating surface 31b, are incident on the light incident surfaces 11A, 11B of the light guide plate 10 at a small angle with respect to the direction perpendicular thereto.

The white light, incident on the light guide plate 10, is guided in this manner as it undergoes total reflection in the bulk of the light guide plate 10. The light thus guided is diverted in its direction so that the light now proceeds upwards to the light radiating surface 12 by the prism patterns and/or the dot patterns formed on the light reflecting surface 13 of the light guide plate 10, as previously explained. At this time, the light components, completely parallel to the light guide direction of the light guide plate 10, are guided through the bulk of the light guide plate 10, without undergoing total reflection therein. These light components are not incident on the light reflecting surface 13, that is, are not incident on the dot patterns or on the prism patterns, and hence are not diverted upwards to the light radiating surface 12. Consequently, these light components are responsible for the lowering of the front surface luminance of light radiated from the light radiating surface 12 of the light guide plate 10.

Thus, the optical component 31, which guides the white light rays radiated from the dichroic prism 26 as the light rays undergo total reflection, and which causes the so reflected white light rays to be incident on the light guide plate 10, operates for decreasing the amount of the components of light completely parallel to the light guide direction of the light guide plate 10, thereby improving the front side luminance.

As a material of the optical component 31, the optical glass, white plate glass or the acrylic resin, controlled to a refractive index such that the white light, radiated from the dichroic prism 26 to fall on the optical component, will be subjected to total reflection, may be used.

Figure 7:
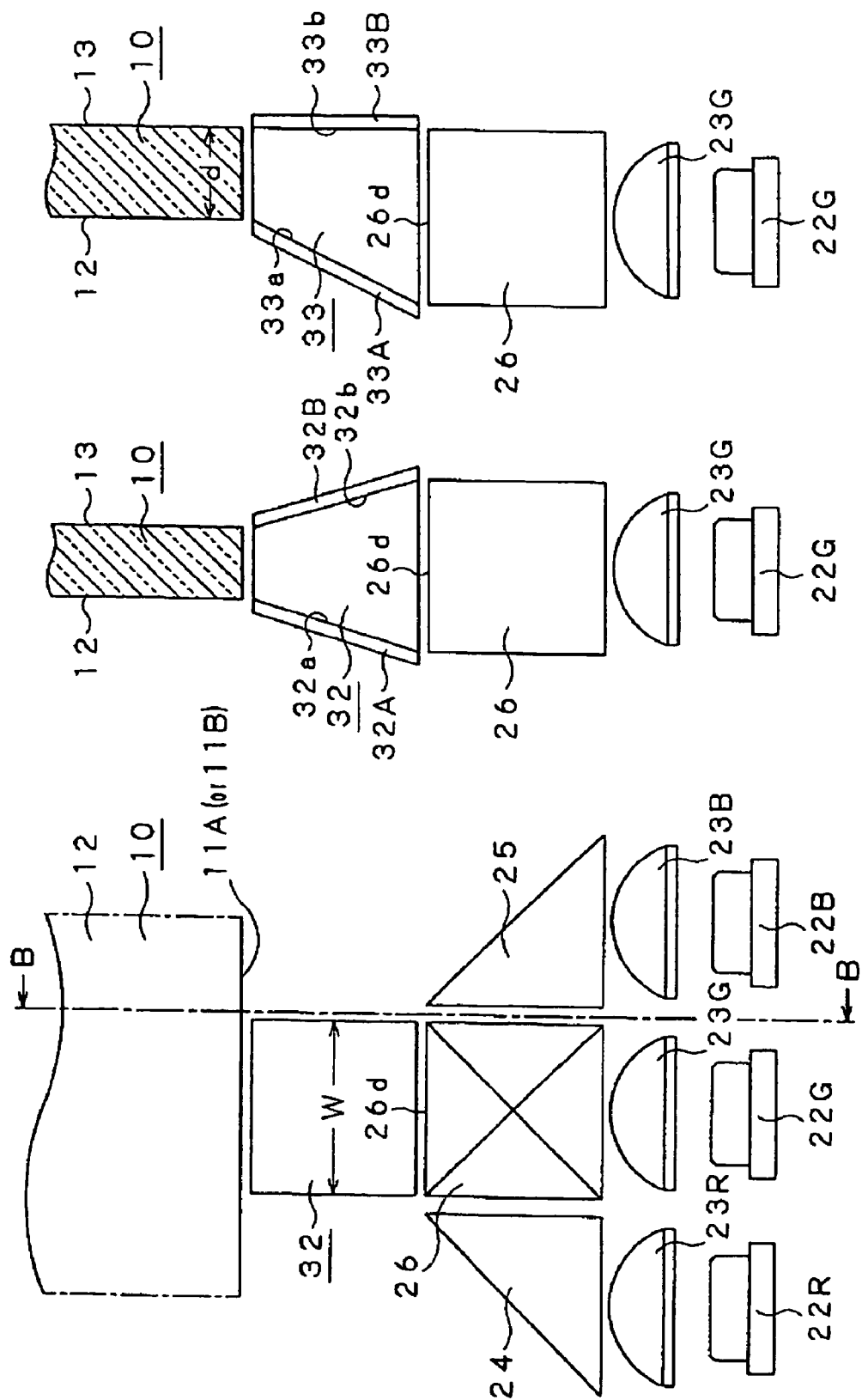
FIG. 7A is a front side view showing essential portions of an exemplary backlight unit in which the optical element added to the illuminating device is formed by a reflective mirror.
FIG. 7B is a cross-sectional view taken along line B-B of FIG. 7A.
FIG. 7C is a cross-sectional view showing a backlight unit having a different disposition of the reflective mirror.

For the illuminating device 21, an optical component 32, made up of two reflective mirrors 32A, 32B, as shown in FIGS. 7A and 7B, may be used in place of the optical component 31. These reflective mirrors 32A, 32B are each formed by a plate-shaped substrate, formed by, for example, a white glass plate, one surface of which plate-shaped substrate is coated with a reflective film. The surfaces of the reflective mirrors, carrying these reflective films, are used as reflective surfaces 32a, 32b. The reflective films, forming the reflective surfaces 32a, 32b, are formed by vapor-depositing aluminum or silver. In case the reflective films are formed by silver vapor deposition, protective films of, for example, SiO2, are formed by vapor deposition on the reflective films for preventing oxidation of the reflective films. The reflective surfaces 32a, 32b may also be formed by bonding aluminum or silver films, vapor-deposited on roll paper sheets, to substrates formed by, for example, white glass plates. In case of using roll paper sheets, having aluminum or silver vapor-deposited thereon, the reflective mirrors 32A, 32B may be produced in large quantities, because the sheets may be bonded at a time on a large area.

The reflective mirrors 32A, 32B are arranged so that the reflective surfaces 32a, 32b thereof are inclined by the same angle as that of the light reflecting surfaces 31c, 31d of the optical component 31. The optical component 32, explained thus far, guides the white light, radiated from the dichroic prism 26, towards the light guide plate 10, as the white light is subjected to reflection or total reflection. Meanwhile, the optical component 32 performs the same role as that of the optical component 31 and hence the detailed explanation thereof is dispensed with.

In the illuminating device 21, an optical component 33 may be formed with use of two reflective mirrors 33A, 33B, as shown in FIGS. 7A and 7B, as one of the reflective mirrors, here the reflective mirror 33B, is arranged with a reflective surface 33b thereof parallel to the light guide direction of the light guide plate 10 and as the other reflective mirror, here the reflective mirror 33A, is arranged in an inclined position, as shown in FIG. 7C. In this case, the reflective mirror 33A is inclined such that it is spaced apart from the opposite side reflective mirror 33B, on the side of the dichroic prism 26, by a distance equal to the width of the light radiating surface 26d, while being spaced apart from the reflective mirror 33B, on the side of the light guide plate 10, by a distance equal to the thickness d of the reflective mirror 33B. The optical component 33, shown in FIG. 7C, has the same function as that of the optical components 31, 32, shown in FIGS. 7A and 7B. Hence, the explanation of the optical components 31, 32, shown in FIGS. 7A and 7B, is referenced, and the detailed explanation is dispensed with.

Figure 8:
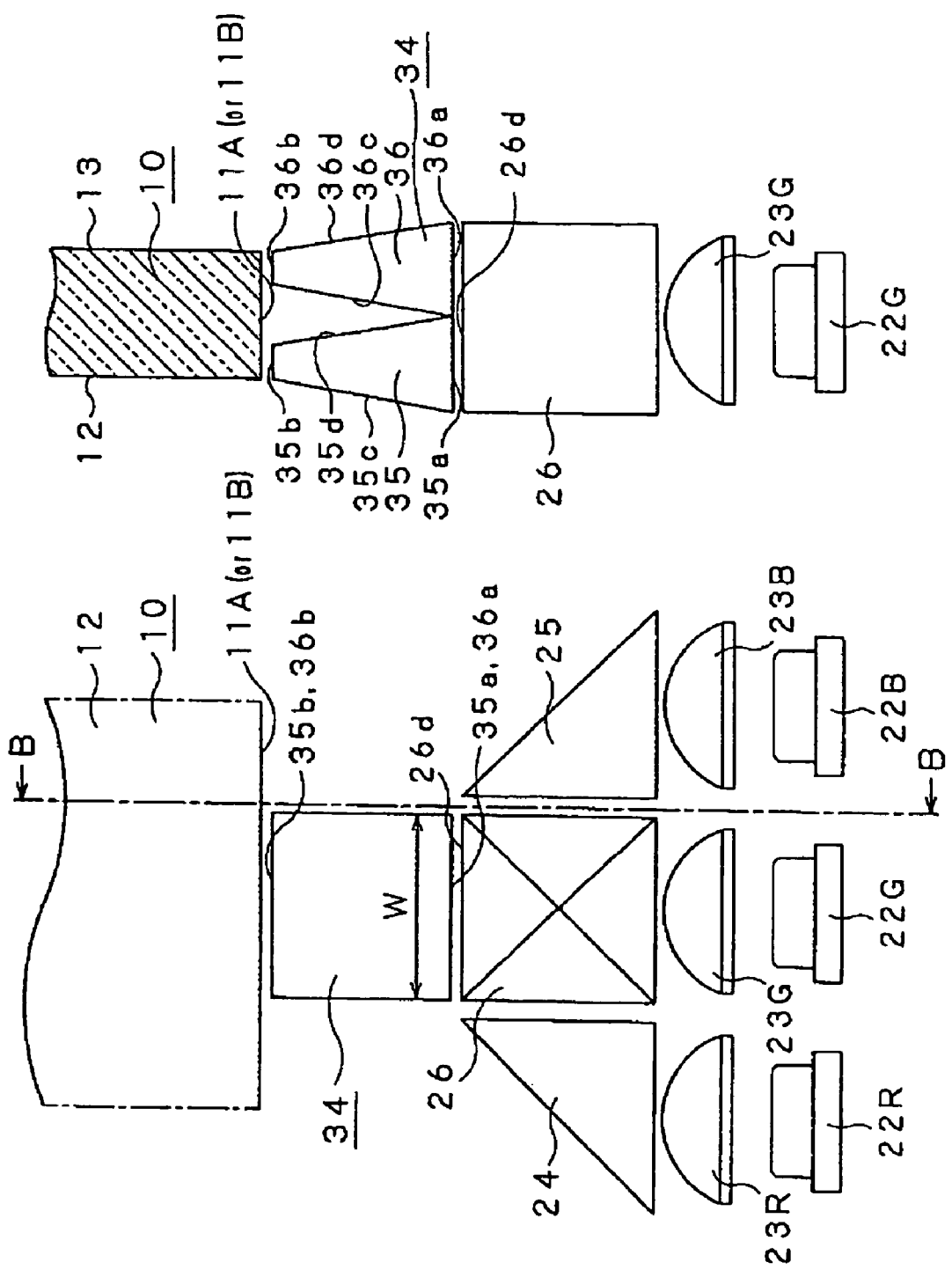
FIG. 8A is a front side view showing essential portions of a further exemplary backlight unit, added by an optical element, and which is provided to an illuminating device.
FIG. 8B is a cross-sectional view taken along line B-B of FIG. 8A.

The illuminating device 21 may be provided with an optical component 34, shown in FIGS. 8A and 8B, in place of with the optical component 31, explained above with reference to FIGS. 5 and 6. This optical component 34 has been combined from a pair of first and second optical components 35, 36 of the same shape, as shown in FIG. 8B.

The proximal ends of the first and second optical components 35, 36 are provided with light incident surfaces 35a, 36a, respectively. On these light incident surfaces are incident white light rays emitted from the light radiating surface 26d of the dichroic prism 26. The combined shape of the light incident surfaces 35a, 36a is identified with the shape of the light radiating surface 26d of the dichroic prism 26. The area of light radiating surfaces 35b, 36b, provided to the distal ends of the first and second optical components 35, 36, is selected to be smaller than the area of the light incident surfaces 35a, 36a, depending on the thickness of the light guide plate 10. For realization of the shape of the distal and proximal ends, the cross-section of the first and second optical components 35, 36 is trapezoidally-shaped, that is, the cross-section is progressively tapered from the light incident surfaces 35a and 36a towards the light radiating surfaces 35b and 36b.

The white light, radiated from the light radiating surface 26d of the dichroic prism 26, is incident from the light incident surfaces 35a and 36a on the first and second optical components 35 and 36, and is guided as it undergoes total reflection on light reflecting surfaces 35c and 35d and on light reflecting surfaces 36c and 36d, until the light is incident on the light incident surfaces 11A, 11B of the light guide plate 10 from the light incident surfaces 35a and 36a.

Since the optical component 34, used here, is made up by two optical components, namely the first and second optical components 35 and 36, the amount of the light component incident at a preset angle on the light guide plate 10 to fall on the dot patterns and/or the prism patterns formed on the light reflecting surface 13 is increased appreciably as compared to the case of the aforementioned monolithic optical component 31. Hence, the light component completely parallel to the light guide direction of the light guide plate 10 may be more efficaciously decreased to drastically increase the front side luminance.

Figure 9:
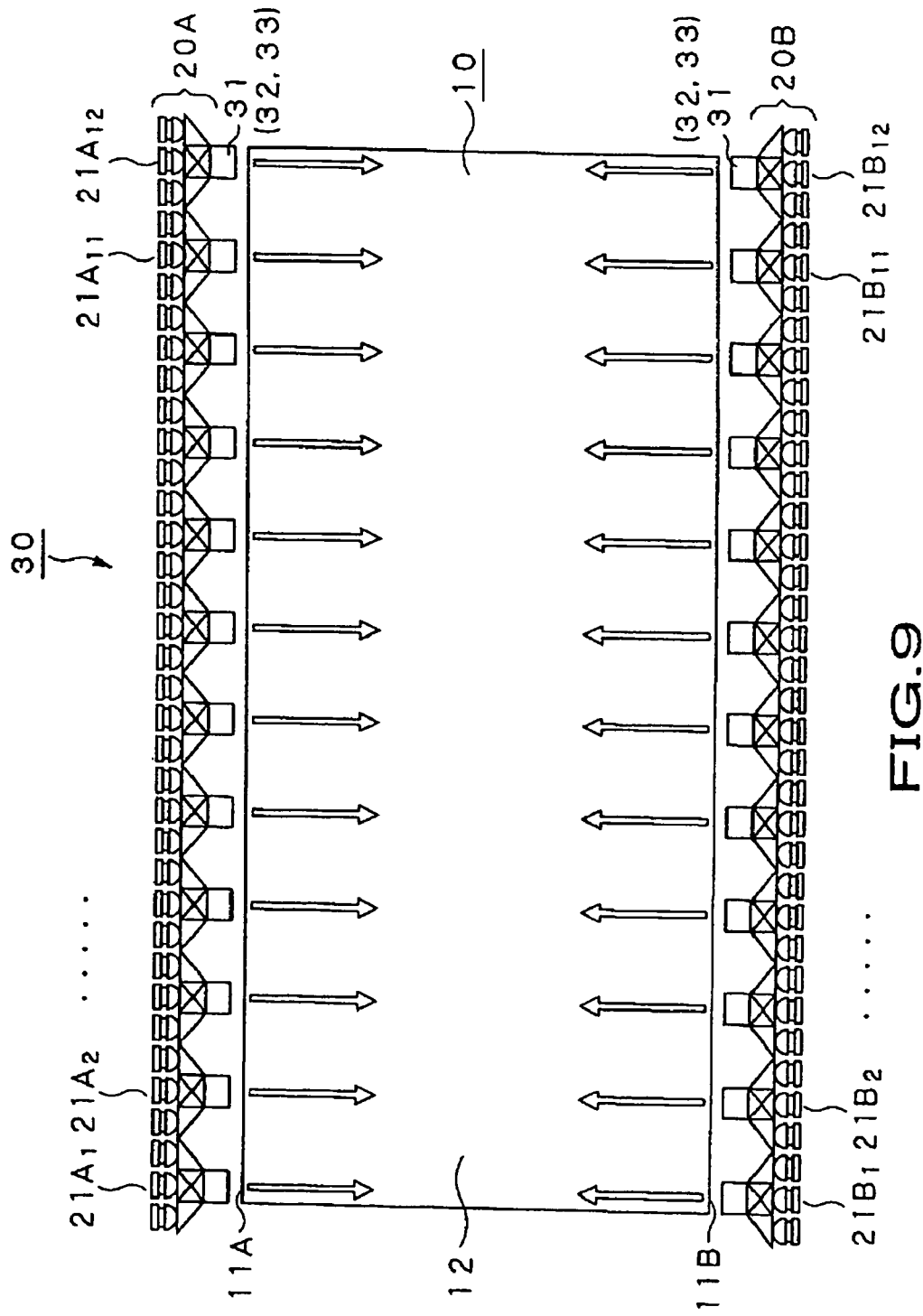
FIG. 9 is a front side view showing a backlight unit added by an optical element, and which is provided to an illuminating device, with the backlight unit being seen from the light radiating surface side.

The illuminating devices 21, having the optical components 31, 32, 33 or 34, are provided facing the light incident surfaces 11A, 11B of the light guide plate 10, as shown in FIG. 9. The illuminating devices 21, arranged on the side of the light incident surface 11A, and the illuminating devices 21, arranged on the side of the light incident surface 11B, are mounted so that white light radiating surfaces thereof are in register with one another, with the light guide plate 10 in-between. A plural number of the illuminating devices 21, arranged on the light incident surfaces 11A, 11B, are juxtaposed at a preset spacing from one another along the light incident surfaces 11A, 11B, respectively, to make up the light source units 20A, 20B, respectively. The illuminating devices 21, arranged on the light incident surfaces 11A, 11B, radiate white light rays, obtained on color mixing the red, green and blue light rays, radiated from the respective light emitting diodes.

Meanwhile, there may be bonded sheets, such as light diffusing sheets or prism sheets, on the light incident surfaces 11A and 11B of the light guide plate 10 to equalize luminance distribution of white light which is radiated with in-plane light radiation from the light radiating surface 12 of the light guide plate 10.

Figure 10:
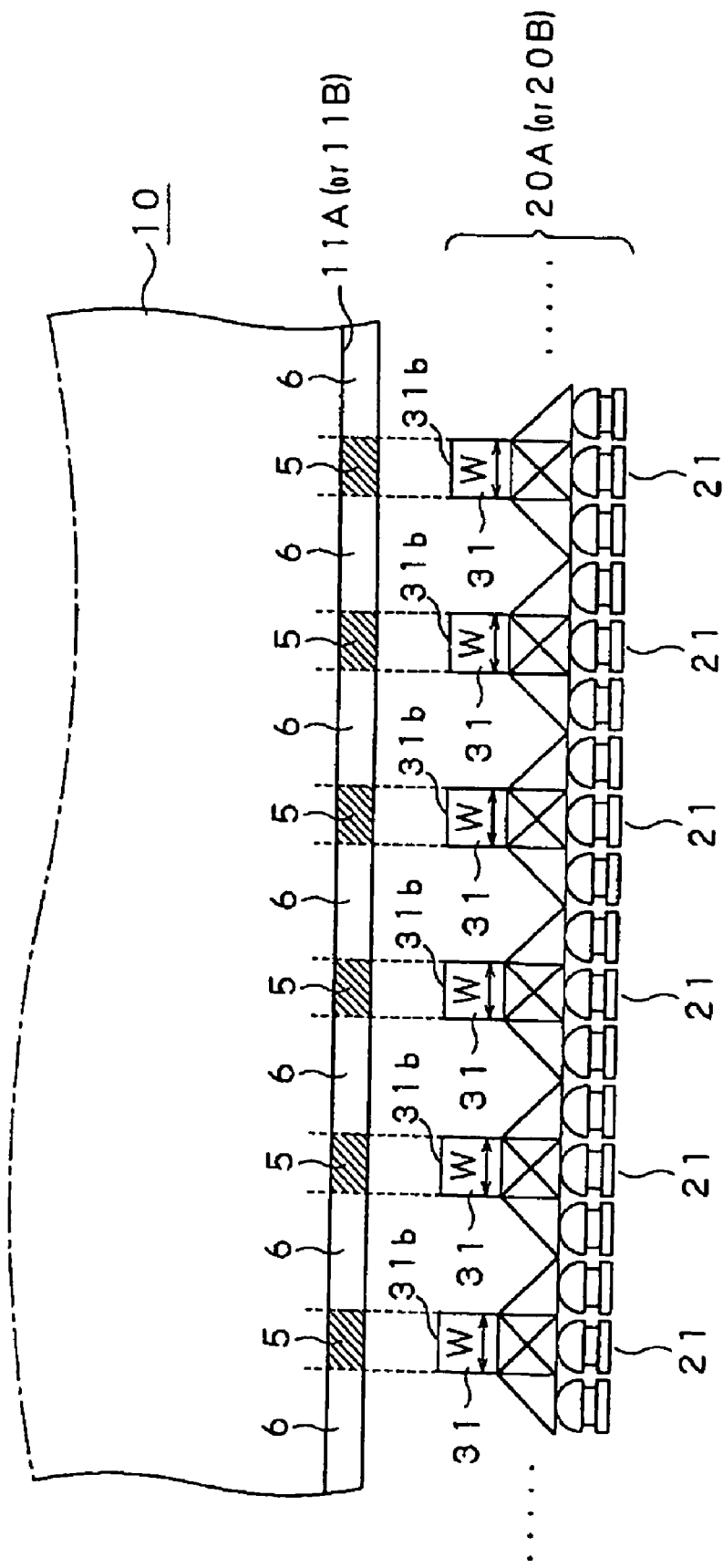
FIG. 10 is a cross-sectional view showing a light diffusion area and a light reflection area formed on a light incident surface of a light guide plate.

FIG. 10 shows the state of light diffusing areas 5 formed by bonding the sheets, such as light diffusing sheets or prism sheets, on the light incident surfaces 11A, 11B of the light guide plate 10, in case the light source units 20A, 20B are formed using the illuminating devices 21 provided with the optical components 31 as previously explained with reference to FIGS. 5 and 6. The light diffusing areas 5 are formed by sticking sheets to regions of the light incident surfaces 11A, 11B of the light guide plate 10 contacted by the light radiating surfaces 31b of the optical components 31 that make up the illuminating devices 21. Hence, each light diffusing area 5 has a transverse width W equal to the transverse width W of the optical component 31.

Figure 11:
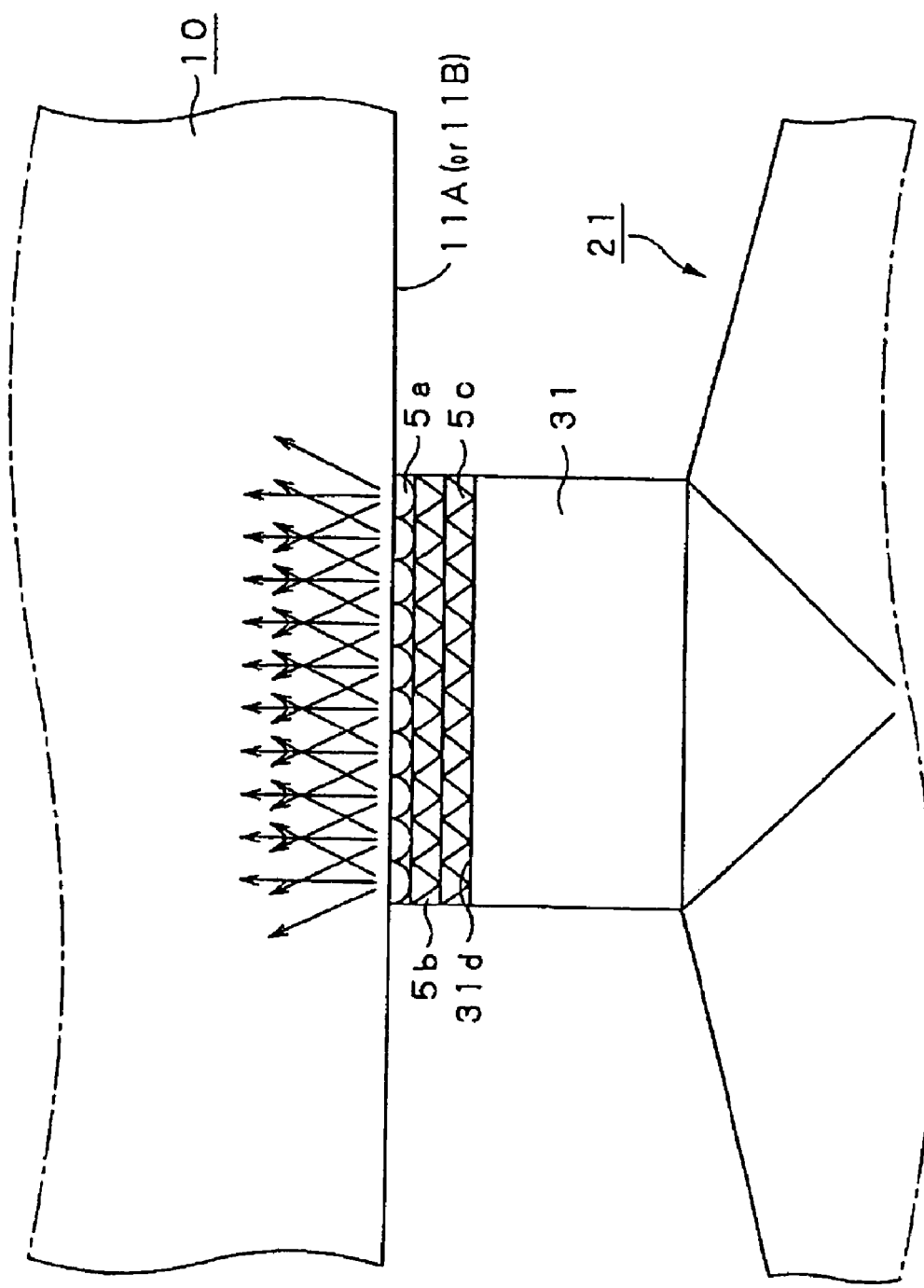
FIG. 11 is a cross-sectional view showing the state in which light becomes diffused by a light diffusing area formed on a light incident surface of the light guide plate.

Referring to FIG. 11, the light diffusing areas 5 are each formed by sequentially bonding a light diffusing sheet 5a, a first prism sheet 5b and a second prism sheet 5c in a layered fashion to the light incident surfaces 11A, 11B of the light guide plate 10. Thus, when the white light, radiated from the light reflecting surface 31d of the optical component 31, is incident on the light diffusing area 5, the light is randomly diffused transversely of the light guide plate 10, by the light diffusing area 5, so as to be guided in the bulk of the light guide plate 10.

Lacking the aforementioned light diffusing area 5 in the light guide plate 10, the light radiated from the light reflecting surface 31d of the optical component 31 may not be readily diffused along the transverse direction of the light guide plate 10, with the result that the light may not be radiated with uniform in-plane light radiation and may suffer from visually noticeable luminance distribution. That is, the light radiated from the light radiating surface 12 is susceptible to luminance variations, for example, striped luminance variations, in which the light radiated presents locally bright areas and locally dark areas.

By providing the light guide plate 10 with the light diffusing area 5, it becomes possible to diffuse the light ubiquitously along the entire transverse area of the light guide plate 10 to suppress the above-described inconvenience.

Meanwhile, the light diffusing area 5 is formed by sequentially layering the light diffusing sheet 5a, first prism sheet 5b and the second prism sheet 5c. However, the present invention is not limited to this combination of sheets and, for example, any one of the above sheets may be formed by itself, or a plural number of such sheets may be formed together, provided that the aforementioned light diffusing effect may be achieved.

As the first prism sheet 5b and the second prism sheet 5c, used for forming the light diffusing area 5, such films as BEFF series (trade name of the product manufactured by SUMITOMO 3M), RBEFF series (trade name of the product manufactured by SUMITOMO 3M) or DBEFF series (trade name of the product manufactured by SUMITOMO 3M), capable of improving the luminance, may be used.

Referring to FIG. 10, there are formed reflecting areas 6 in regions of the light incident surfaces 11A and 11B of the light guide plate 10 where there are not provided the light diffusing areas 5. The reflecting areas 6 are formed by sticking reflective sheets having aluminum or silver vapor-deposited thereon.

Lacking the reflecting areas 6 on the light guide plate 10, there leaks out the white light incident from the light incident surface 11A but which has been guided to the opposite side light incident surface 11B without exiting from the light radiating surface 12.

The reflecting areas 6 suppress the leakage to outside the light guide plate 10 of the white light incident from the opposite side light incident surface and guided in the light guide plate, without exiting from the light radiating surface 12, mainly by reflection, thereby making it possible to appreciably improve the utilization efficiency of light emitted by the light emitting diodes 22.

Figure 12:
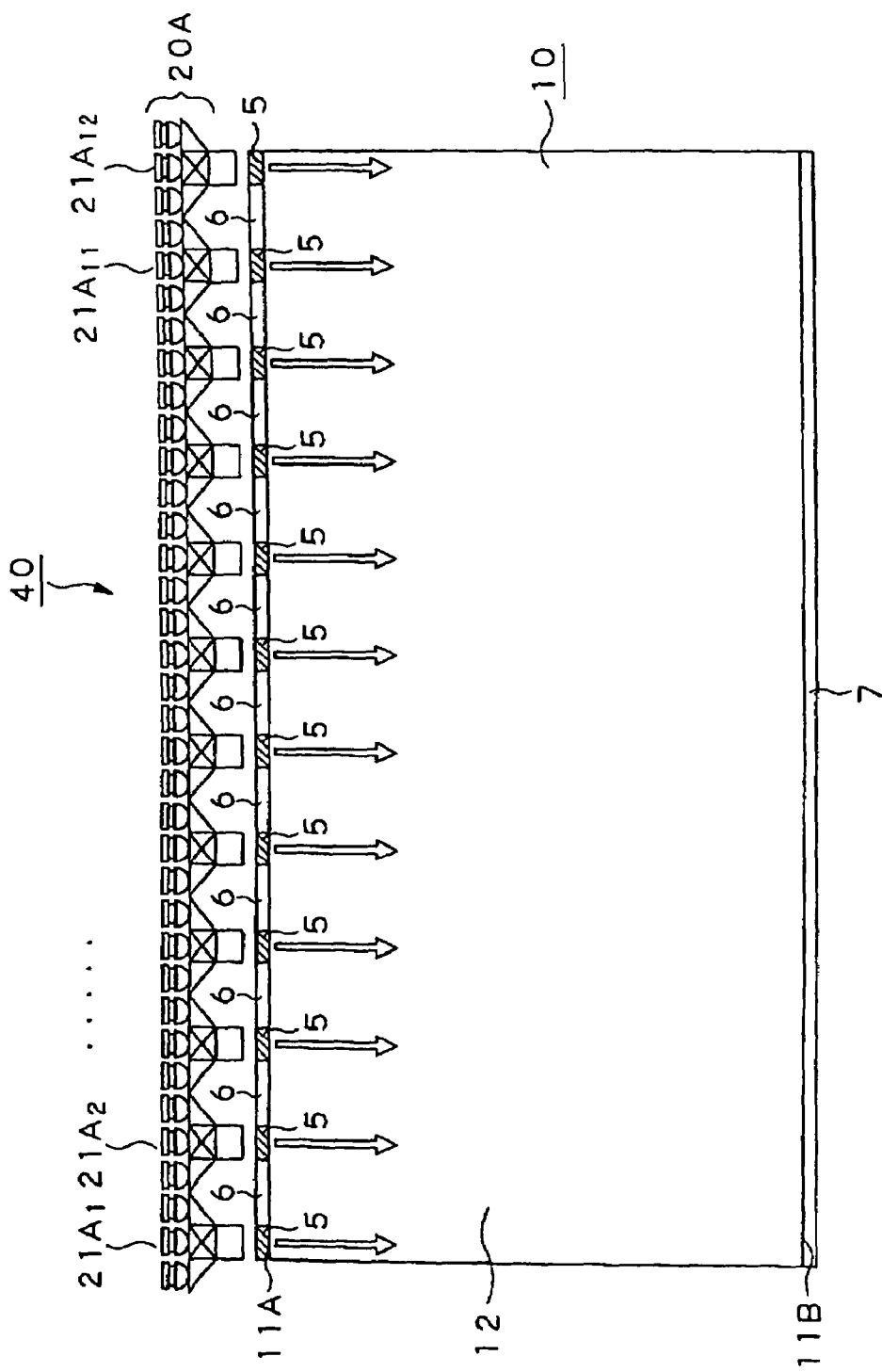
FIG. 12 is a front side view showing a backlight unit, fitted with an illuminating device on one side of the light guide plate, with the backlight unit being seen from the light radiating surface side.

The arrangement of the illuminating devices 21 relative to the light guide plate 10 is not limited to that shown in FIGS. 1 or 9. For example, a plural number of illuminating devices 21 may be arranged only on one light incident surface, such as the light incident surface 11A, as shown in FIG. 12. In this case, the plural illuminating devices 21 may again be arranged side-by-side at a preset interval along the light incident surface 11A. That is, only the light source unit 20A, shown in FIG. 9, may be used to form a backlight unit 40 shown in FIG. 12.

In this case, the aforementioned light diffusing areas 5 and the reflecting areas 6 are formed only on the light incident surface 11A. On the light incident surface 11B, reflecting surfaces 7, similar to the reflecting areas 6, may be formed by sticking reflective sheets in position. The reflecting surfaces 7 suppress the white light, radiated from the illuminating devices 21 and guided through the bulk of the light guide plate 10 without exiting from the light radiating surface 12, or the white light reflected by the reflecting areas 6, from leaking outwards from the light guide plate 10, thereby improving the utilization efficiency of the light radiated from the light emitting diodes 22.

In the backlight unit 30, shown in FIG. 1 or 9, one of the two illuminating devices 21, arranged with the white light radiating surfaces facing each other, may be offset by one-half pitch (½ pitch) along the transverse direction of the light guide plate 10, in which are arranged the illuminating devices 21, so that the white light radiating surfaces do not face one another. By arranging the white light radiating surfaces of the two illuminating devices 21, with respect to the light incident surfaces 11A, 11B of the light guide plate 10, facing one another with an offset of one-half pitch, it becomes possible to reduce luminance variations.

Figure 13:
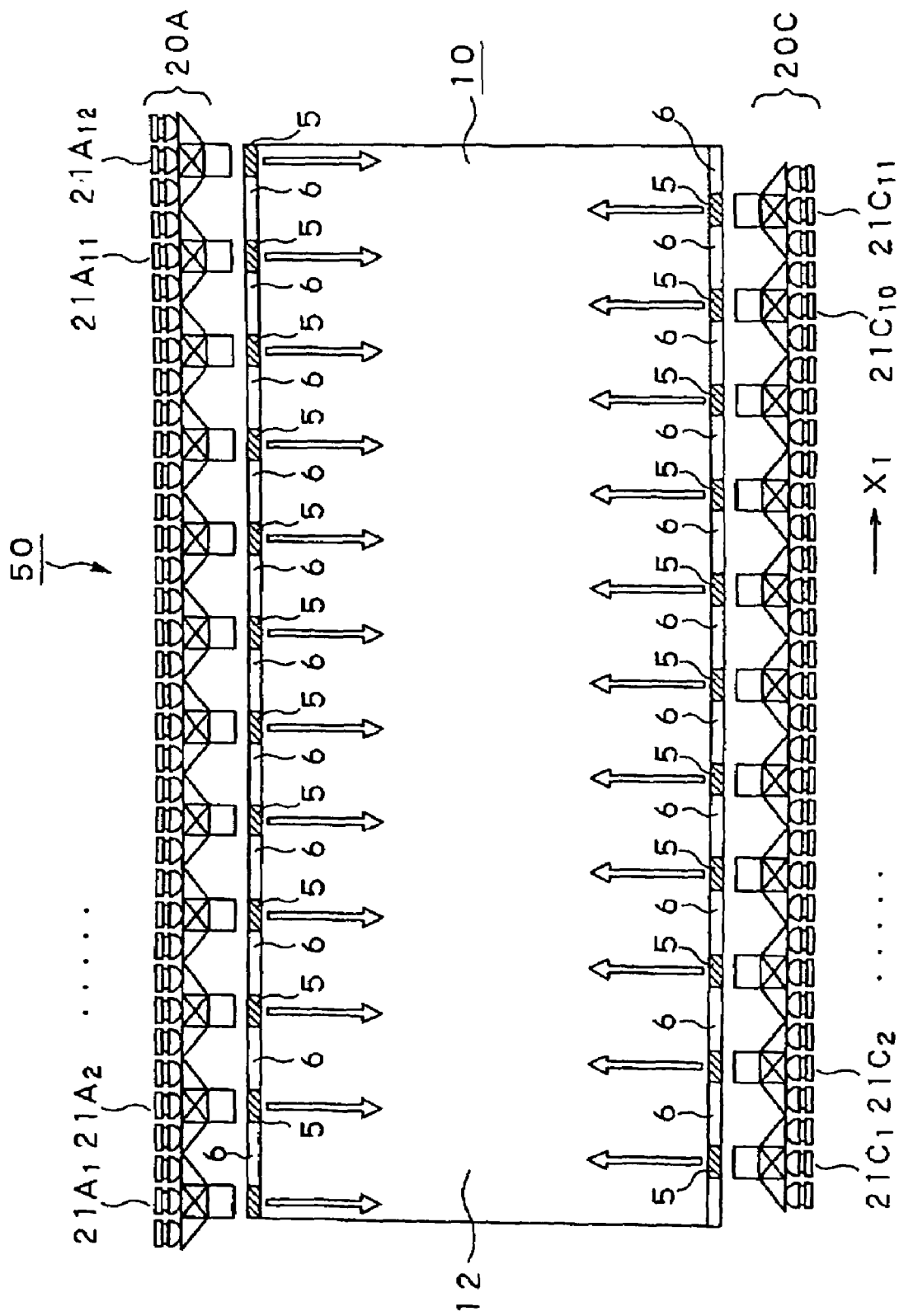
FIG. 13 is a front side view showing a backlight unit, fitted with an illuminating device on each of opposite lateral sides of the light guide plate.

For example, the light source unit 20A, shown in FIG. 9, is not offset in its mounting position, and the opposite side light source unit 20B is offset by one-half pitch along the transverse direction of the light guide plate 10, that is, along the direction shown by arrow X1 in FIG. 13, for forming a light source unit 20C. By this offsetting by one-half pitch, one illuminating device 21 needs to be eliminated. Hence, the light source unit 20C is formed by 11 illuminating devices 21C1 to 21C11. That is, a backlight unit 50 may be provided using the light source units 20A and 20C, as shown in FIG. 13.

In this case, the aforementioned light diffusing areas 5 and the reflecting areas 6 may be formed on the light incident surfaces 11A and 11B. The illuminating devices 21 of the backlight units 40 and 50 may use any one of the optical components 31 to 34 shown in FIG. 1, as in the case of the backlight unit 30 shown in FIG. 1.

That is, the present invention is not limited by the manner of disposition of the illuminating device 21 with respect to the light guide plate 10, such that any suitable disposition of the backlight unit may be used.

The light source units 20A, 20B may use illuminating devices other than the illuminating devices 21, that is, any one of the two illuminating devices having the following configurations. One of them is an illuminating device radiating the white light obtained on color mixing by color mixing means employing two beam splitter prisms, and the other is an illuminating device radiating white light obtained on color mixing by color mixing means employing a plate including a wavelength selecting transmitting/reflecting surface which selectively transmits or reflects the light depending on the difference in wavelengths.

First, referring to FIG. 14, an illuminating device 61, employing two beam splitter prisms, as color mixing means for mixing red light, green light and blue light, emitted by the respective light emitting diodes, to form white light, will be explained.

Figure 14:
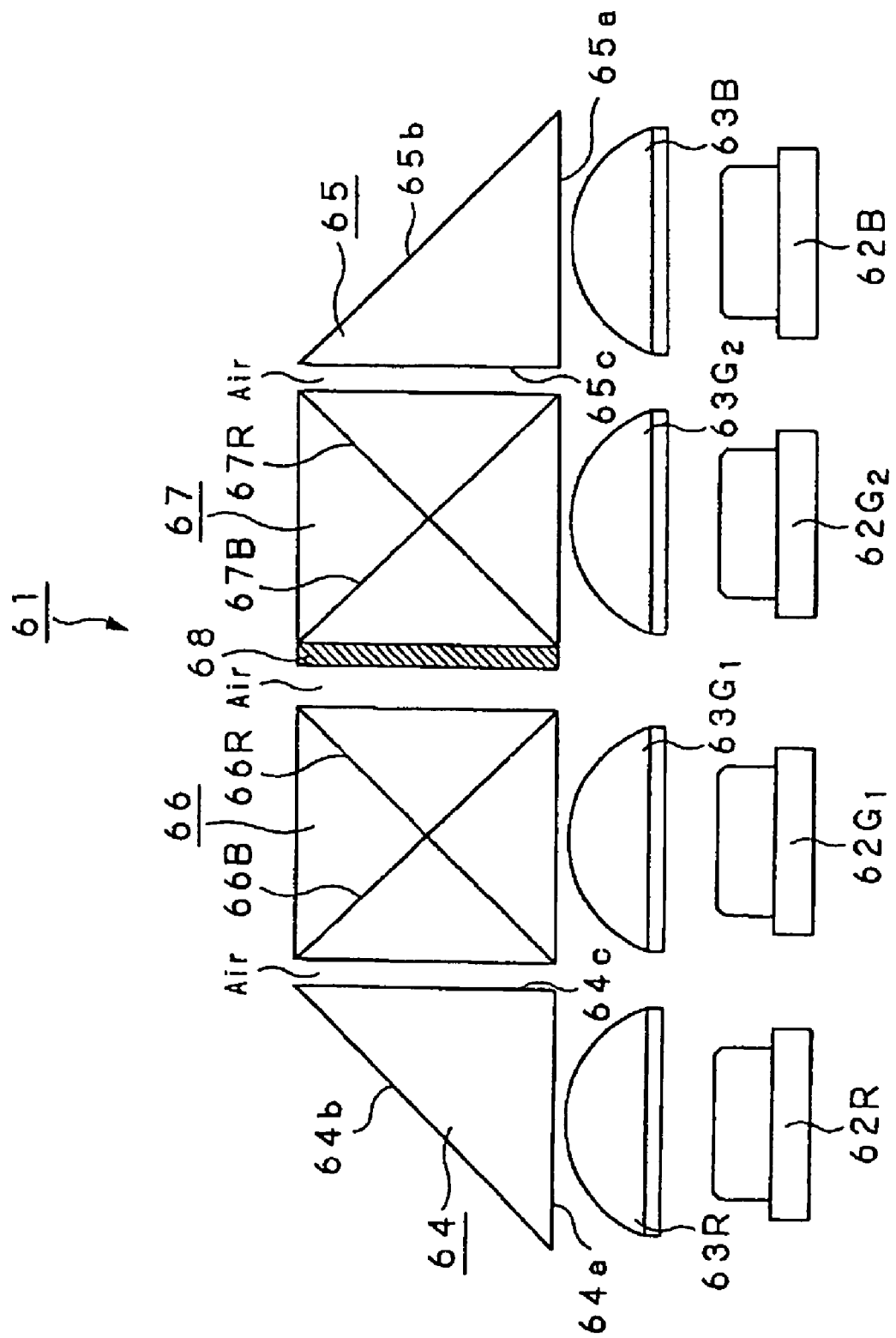
FIG. 14 is a front side view showing an illuminating device employing two light sources emitting green light rays.

Referring to FIG. 14, the illuminating device 61 includes light emitting diodes 62R, 62G1, 62G2 and 62B, light condensing lenses 63R, 63G1, 63G2 and 63B, arranged on the light radiating surfaces of the light emitting diodes 62R, 62G1, 62G2 and 62B, respectively, triangular prisms 64, 65, beam splitter prisms 66, 67 and a half wave plate 68. The triangular prisms 64, 65 are arranged on the light radiating sides of the light condensing lenses 63R and 63B, while the beam splitter prisms 66, 67 are arranged on the light radiating sides of the light condensing lenses 63G1 and 63G2, respectively.

If, in the explanation to follow, the light emitting diodes 62R, 62G1, 62G2 and 62B need not be distinguished from one another, while the light condensing lenses 63R, 63G1, 63G2 and 63B also need not be distinguished from one another, the light emitting diodes and the light condensing lenses are referred to as light emitting diodes 62 and light condensing lenses 63, respectively.

The triangular prism 64 and the beam splitter prism 66 are arranged with an air layer Air in-between so that the prisms will not be contacted intimately with each other. The triangular prism 65 and the beam splitter prism 67 are also arranged with an air layer Air in-between so that the prisms will not be contacted intimately with each other. Although the air layer Air is shown exaggerated in FIG. 14, it is in actuality of a micron order size in order to minimize loss of light guided therein. The air layer Air may be formed by arranging a number of beads of plastics, each with a diameter of the order of 0.5 μm, between the triangular prism 64 and the beam splitter prism 66 and between the triangular prism 65 and the beam splitter prism 67.

The half wave plate 68 is provided between the beam splitter prisms 66 and 67 and is affixed to the beam splitter prism 66 or to the beam splitter prism 67. In FIG. 14, this half wave plate 68 is affixed to the beam splitter prism 67. The beam splitter prism 67, provided with the half wave plate 68, and the beam splitter prism 66, are also mounted with an air layer Air in-between to prevent intimate contact with each other, as also shown in FIG. 4.

The triangular prisms 64, 65 and the beam splitter prisms 66, 67 operate as color mixing means adapted for being supplied via light condensing lenses 63 with light emitted by the light emitting diodes 62 and for mixing the colors to derive white light.

Since the function of the air layer Air provided in arranging the triangular prisms 64, 65 and the beam splitter prisms 66, 67 is similar to the function of the air layer Air provided between the triangular prism 24 and the dichroic prism 26 of the illuminating device 21, shown in FIG. 1, the detailed explanation for it is dispensed with.

The light emitting diodes 62R, 62B emit light rays of wavelength ranges exhibiting the red color and the blue color, respectively. The light emitting diodes 62G1, 62G2 both emit light of a wavelength range exhibiting the green color.

Any suitable light emitting diodes may be used as the light emitting diodes 62R, 62G1, 62G2 and 62B, provided that the light emitting diodes used satisfy the aforementioned conditions. For example, such light emitting diodes of the high dome (High-Dome), low dome (Low-Dome) or the flat (Flat) type, specifying the directivity pattern of the emitted light, may be used.

Shown below are design parameters of the light emitting diodes 62R, 62G1, 62G2 and 62B, used for example for the illuminating device 61.

Light emitting diode 62R: red (color of emitted light); 625 nm (center wavelength); Low-Dome (shape); power consumption, 1 W Light emitting diode 62G1: green (color of emitted light); 530 nm (center wavelength); Low-Dome (shape); power consumption, 3 W Light emitting diode 62G2: green (color of emitted light); 530 nm (center wavelength); Low-Dome (shape); power consumption, 3 W Light emitting diode 62B: royal blue (color of emitted light); 455 nm (center wavelength); Low-Dome (shape); power consumption, 3 W The light condensing lenses 63R, 63G1, 63G2 and 63B condense red light rays, green light rays, green light rays and blue light rays, respectively, emitted by the light emitting diodes 62R, 62G1, 62G2 and 62B, respectively, to cause these light rays to be incident on the triangular prism 64, beam splitter prisms 66, 67 and on the triangular prism 65, respectively. Since the red light rays, green light rays, green light rays and the blue light rays, emitted by the light emitting diodes 62R, 62G1, 62G2 and 62B, respectively, are divergent light rays having directivity such that the light rays are spread out in a radial pattern, these light rays are refracted by the light condensing lenses 63R, 63G1, 63G2 and 63B and thereby turned into collimated light. In actuality, several percent of light is not turned into completely collimated light and is radiated from the light condensing lenses 63R, 63G1, 63G2 and 63B as light having a slightly divergent tendency.

Since the light condensing lenses 63 collimate the divergent light, emitted by the light emitting diodes 62, the light rays, which otherwise may stray out of the downstream side triangular prisms 64, 65 and beam splitter prisms 66, 67 where the light is mixed to form white color as it is guided through the respective prisms, may be suppressed from leaking outwards in the premixing stage. The result is the improved utilization efficiency of light emitted by the light emitting diodes 62.

The light condensing lens 63 is a spherical or an aspherical lens and may be formed of optical glass exemplified by BK-7 (trade name of a product manufactured by SCHOTT), NBFD13 (trade name of a product manufactured by HOYA) or SF1 (trade name of a product manufactured by SCHOTT).

The surface of the light condensing lens 63 is coated with an anti-reflection film (AR coating film) for lowering the reflectance on the lens surface and elevating the transmittance. For example, a single-layer anti-reflection coating by MgF2 or a multi-layer coating by a multi-layer dielectric coating may be applied to the surface of the light condensing lens 63.

Figure 15:
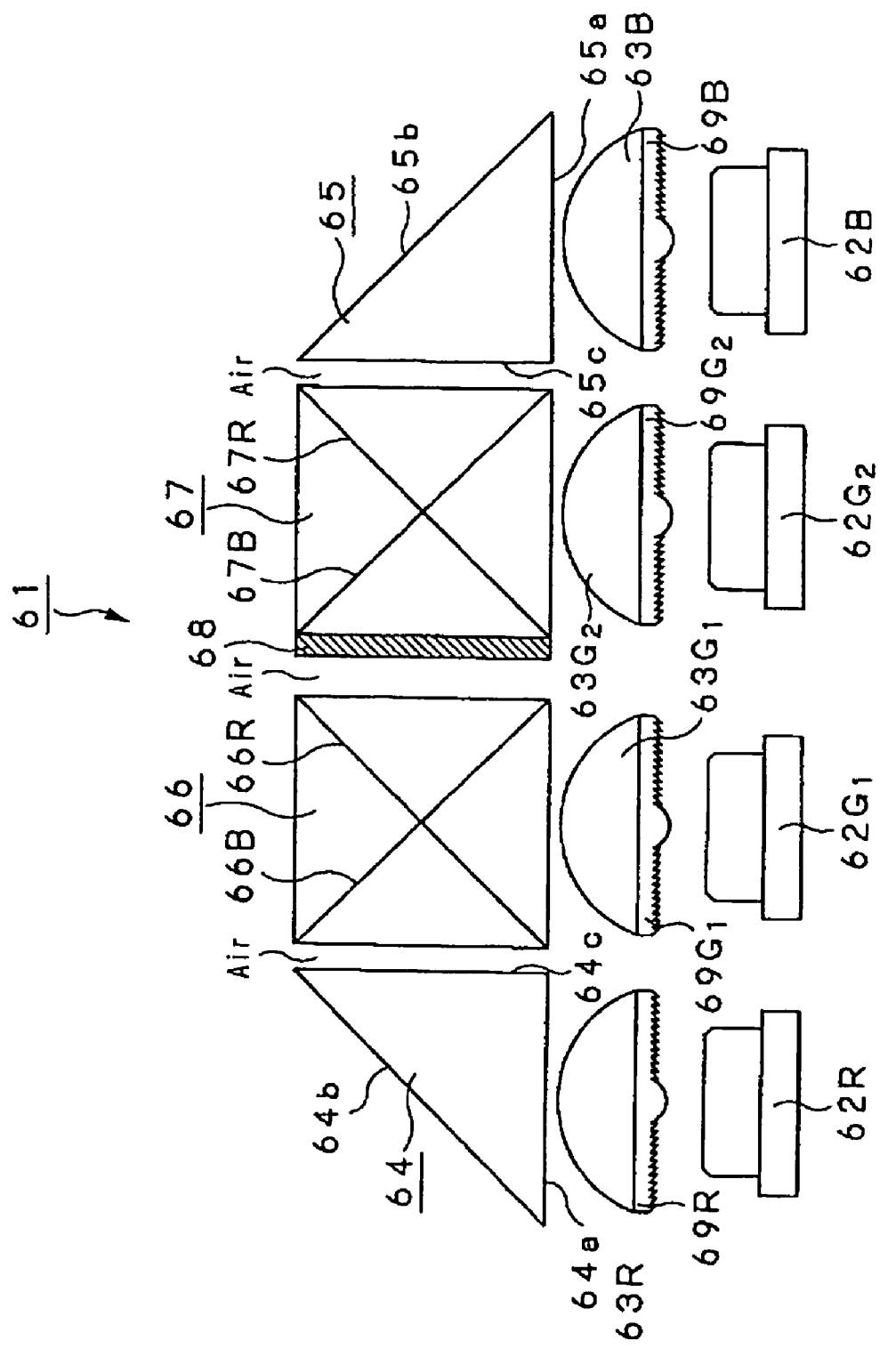
FIG. 15 is a front side view showing an illuminating device in which a Fresnel lens is added to a light condensing lens.

On the light incident surfaces of the light condensing lenses 63R, 63G1, 63G2 and 63B, there may be formed Fresnel lenses 69R, 69G1, 69G2 and 69B as one with the light condensing lenses 63, as shown in FIG. 15.

In case the Fresnel lenses 69R, 69G1, 69G2 and 69B do not have to be distinguished one from another, these are collectively termed Fresnel lenses 69.

The Fresnel lenses are each a prism composed of plural concentrically-shaped prisms, assembled together in the form of ring-shaped steps, and are prepared by injection molding of acrylic resin. By arranging the Fresnel lenses ahead of the light condensing lenses 63, as shown in FIG. 15, the function of the light condensing lenses 63, that is, the function of refracting the divergent light into collimated light, may efficaciously be displayed.

The Fresnel lenses 69 may be used as shown in FIG. 15, without dependency on whether the light condensing lenses 63 are spherical lenses or non-spherical lenses. In case the light condensing lenses 63 are aspherical lenses, and the Fresnel lenses 69 are used, the divergent light may be turned more efficaciously into collimated light.

In case the Fresnel lenses 69 are used in combination with the light condensing lenses 63, a polycarbonate resin, less expensive than the costly optical glass, may be used as the material of the light condensing lenses 63. If the Fresnel lenses 69 are used in combination with the light condensing lenses 63, the light condensing lenses 63, obtained on molding the polycarbonate resin, may yield the results equivalent to those when only the light condensing lenses 63 molded from the optical glass are used.

Anti-reflection coating films (AR coating films) may be applied to the Fresnel lenses 69 to lower the reflection from the lens surface to elevate the transmittance.

The light condensing lenses 63 may also be molded as one with the Fresnel lenses 69 so that the Fresnel lenses 69 perform the role of the light incident surfaces of the light condensing lenses. The Fresnel surfaces of the Fresnel lenses 69 may be spherically-shaped or aspherically-shaped as desired.

Reverting to FIG. 14, the configuration of the illuminating device 61 will be explained. The triangular prisms 64, 65 are each a right-angled prism, having a bottom side shaped as a right-angled isosceles triangle, and are provided on the light radiating surfaces of the light condensing lenses 63R, 63B. On respective inclined sides 64b, 65b of the triangular prisms 64, 65, there are formed reflective films which reflect or totally reflect the light incident from light incident surfaces 64a, 65a to guide the so reflected light to light radiating surfaces 64c, 64d.

For example, the reflective films may be formed on the inclined sides 64b, 65b by vapor-depositing aluminum or silver on the inclined sides 64b, 65b. In case silver has been applied by vapor deposition on the inclined sides, protective films, such as SiO2, are applied by vapor deposition, in order to prevent oxidation of vapor-deposited silver.

Beam splitter prisms 66, 67 are cubically-shaped prisms provided on the light radiating surfaces of the light condensing lenses 63G1, 63G2, respectively.

The beam splitter prism 66 includes a first transmitting/reflecting surface 66B and a second transmitting/reflecting surface 66R. The first transmitting/reflecting surface transmits visible light of a wavelength not lower than that of green light emitted by the light emitting diode 62G1, reflects the linear polarized light of the visible light of a wavelength other than the above wavelength, that is, the blue light emitted by the light emitting diode 62B, oscillated in a first oscillating plane, and which transmits the linear polarized light of the same visible light, oscillated in a second oscillating plane perpendicular to the first oscillating plane. The second transmitting/reflecting surface 66R transmits visible light of a wavelength not higher than that of green light emitted by the light emitting diode 62G1, reflects the linear polarized light of the visible light of a wavelength other than the above wavelength, that is, the red light emitted by the light emitting diode 62R, oscillated in a first oscillating plane, and which transmits the linear polarized light of the same visible light oscillated in a second oscillating plane. The first and second transmitting/reflecting surfaces are arranged to intersect each other in the form of a letter X.

In the present embodiment, the linear polarized light, oscillating in the first plane of oscillations, is the S linear polarized light or S-polarized light, and the linear polarized light, oscillating in the second plane of oscillations, is the P linear polarized light or P-polarized light, for convenience in explanation.

The first transmitting/reflecting surface 66B and the second transmitting/reflecting surface 66R transmit both the S-polarized light rays and the P-polarized light rays, as mutually orthogonal linear polarized light rays of green light rays emitted by the light emitting diode 62G1.

The beam splitter prism 67 includes a first transmitting/reflecting surface 67R and a second transmitting/reflecting surface 67B. The first transmitting/reflecting surface transmits visible light of a wavelength range not higher than that of green light emitted by the light emitting diode 62G2, reflects the S-polarized light of the visible light of the other wavelength range, that is, the red light emitted by the light emitting diode 62R, and transmits the P-polarized light of the same visible light, and the second transmitting/reflecting surface transmits visible light of a wavelength not lower than that of green light emitted by the light emitting diode 62G2, reflects the S-polarized light and transmits the P-polarized light of the visible light of the other wavelength range, that is, the blue light rays emitted by the light emitting diode 62B. The first and second transmitting/reflecting surfaces are arranged to intersect each other in the form of a letter X.

The first transmitting/reflecting surface 67R and the second transmitting/reflecting surface 67B transmit both the S-polarized light rays and the P-polarized light rays, which are mutually orthogonal linear polarized light rays of green light rays emitted by the light emitting diode 62G2.

The first transmitting/reflecting surface 66B and the second transmitting/reflecting surface 66R of the beam splitter prism 66 and the first transmitting/reflecting surface 67R and the second transmitting/reflecting surface 67B of the beam splitter prism 67 are multi-layer dielectric films, formed by thin film forming methods, such as vacuum deposition method or sputtering method. Hence, the wavelength range of transmission and reflection, that is, the cut-off wavelength range, may freely be controlled by varying the film structure formed on layering, material type or the film thickness of the layered films, depending on, for example, the characteristics of the light emitting diodes 62 used.

In this manner, the wavelength ranges, where the red light rays, green light rays and the blue light rays, emitted from the respective light emitting diodes 62, are overlapped with one another, may be cut off to elevate the color purity of white light radiated from the illuminating device 61.

Although the light emitting characteristics of the respective light emitting diodes 62 may be designed so that the wavelength ranges of the diodes are not overlapped with one another, this turns out to be extremely costly. With the illuminating device 61, the multi-layer dielectric films, making up the first transmitting/reflecting surface 66B and the second transmitting/reflecting surface 66R of the beam splitter prism 66 and the first transmitting/reflecting surface 67R and the second transmitting/reflecting surface 67B of the beam splitter prism 67, may be adjusted to control the color purity. Hence, light emitting diodes available at low costs, exhibiting variations in characteristics, may be used as the light emitting diodes 62.

The surfaces of the beam splitter prisms 66 and 67 may be coated with anti-reflection films (AR coating films), such as multi-layer dielectric films (AR coating films) for lowering the reflection and for elevating the transmittance.

The half wave plate 68 converts the P-polarized light of red light rays, transmitted through the second transmitting/reflecting surface 66R of the beam splitter prism 66, into S-polarized light, which is the linear polarized light oscillated in a plane of oscillations perpendicular to the P-polarized light. The half wave plate 68 also converts the P-polarized light of blue light, transmitted through the first transmitting/reflecting surface 67B of the beam splitter prism 67, into the S-polarized light.

The beam splitter prism 66 transmits the green light, emitted by the light emitting diode 62G1 and incident via light condensing lens 63G1 on the beam splitter prism 66, through the first transmitting/reflecting surface 66B and the second transmitting/reflecting surface 66R.

The beam splitter prism 66 reflects the S-polarized light of red light rays, emitted by the light emitting diode 62R and incident via light condensing lens 63R and triangular prism 64 on the beam splitter prism 66, by its second transmitting/reflecting surface 66R.

The beam splitter prism 66 also reflects the S-polarized light of the blue light rays, emitted by the light emitting diode 62B and incident on the beam splitter prism via light condensing lens 63B, triangular prism 65, beam splitter prism 67 and via half wave plate 68, by its first transmitting/reflecting surface 66B, to generate white light, obtained on color mixing the green light, S-polarized light of the red light and the S-polarized light of the blue light, to radiate the so generated white light.

The beam splitter prism 67 transmits the green light, emitted by the light emitting diode 62G2 and incident via light condensing lens 63G2 on the beam splitter prism 67, by its first transmitting/reflecting surface 67R and the second transmitting/reflecting surface 67B.

The beam splitter prism 67 also transmits the S-polarized light of blue light, emitted by the light emitting diode 62B and incident on the beam splitter prism through the light condensing lens 63B and through the triangular prism 65, by the second transmitting/reflecting surface 67B.

The beam splitter prism 67 also reflects the S-polarized light of the red light, emitted by the light emitting diode 62R and incident on the beam splitter prism via light condensing lens 63R, triangular prism 64, beam splitter prism 66 and via half wave plate 68, on the first transmitting/reflecting surface 67R, to generate white light, obtained on color mixing the green light, S-polarized light of the blue light and the S-polarized light of the red light, to radiate the so generated white light.

In this illuminating device 61, the optical component 31, 32, 33 or 34 for adapting the illuminating device 21 to the thickness of the light guide plate 10, explained with reference to FIGS. 5 to 8, may be used. Since white light is radiated from the first beam splitter prism 66 and the second beam splitter prism 67, each of these prisms may be associated with one of the optical components 31 to 34. The white light radiating surfaces of the first beam splitter prism 66 and the second beam splitter prism 67 may be thought of as one white light radiating surface and use may be made of the optical component 31, 32, 33 or 34 matched to this sole white light radiating surface.

By providing the illuminating device 61 with the optical component 31, 32, 33 or 34, the front surface luminance of the white light, radiated with in-plane light emission from the light radiating surface 12 of the light guide plate 10, may appreciably be improved.

Figure 16:
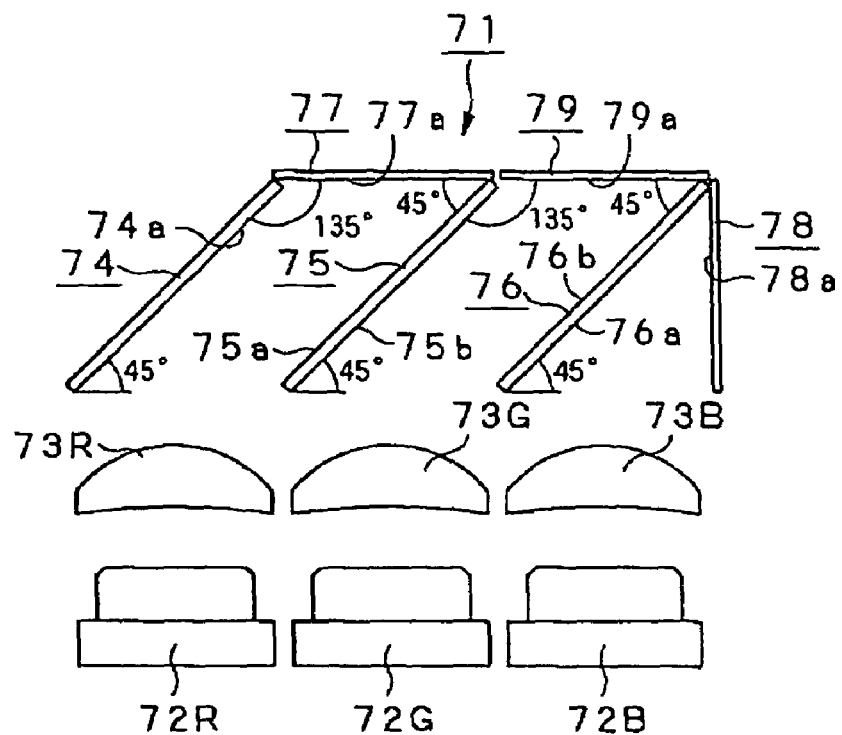
FIG. 16 is a front side view showing an illuminating device which uses a wavelength selecting transmitting/reflecting plate.

Referring to FIG. 16, an illuminating device 71, employing a plate having a wavelength selecting transmitting/reflecting surface, operating as color mixing means for mixing the red light, green light and blue light, emitted by the light emitting diodes, into white light, will be explained.

Referring to FIG. 16, the illuminating device 71 includes light emitting diodes 72R, 72G and 72B, light condensing lenses 73R, 73G and 73B, provided on the light radiating surfaces of the light emitting diodes 72R, 72G and 72B, respectively, a flat-plate-shaped reflective mirror 74 and flat-plate-shaped beam splitter plates 75, 76, provided to the light radiating surfaces of the light condensing lenses 73R, 73G and 73B, respectively, flat-plate-shaped reflective mirrors 77, 78 and a flat-plate-shaped optical plate 79.

Meanwhile, if there is no necessity for distinguishing the light emitting diodes 72R, 72G and 72B from one another or for distinguishing the light condensing lenses 73R, 73G and 73B from one another, they are collectively referred to as light emitting diodes 72 or as light condensing lenses 73, respectively.

The reflective mirror 74 and the beam splitter plates 75, 76 are arranged in rear of the light condensing lenses 73R, 73G and 73B, respectively, so that the respective major surfaces thereof are tilted at an angle of 45° with respect to the optical axes of the light condensing lenses 73R, 73G and 73B. Referring to FIG. 16, the reflective mirror 74 and the beam splitter plates 75, 76, tilted at the above angle, are arranged parallel to one another.

The reflective mirror 77 is arranged so that a reflective surface 77a thereof is directed to the light condensing lens 73 and tilted by 135° and by 45° relative to the reflective plate 74 and the beam splitter plate 75, respectively.

The reflective mirror 78 is arranged facing the beam splitter plate 76 so that its reflective surface 78a is parallel to the optical axis of the light condensing lens 73B. The reflective mirror 78 is arranged at an angle of 45° with respect to the beam splitter plate 76.

The optical plate 79 is arranged with its optical surface 79a facing the light condensing lens 73, and is inclined at angles of 135° and 45° with respect to the beam splitter plates 75 and 76, respectively.

The light emitting diodes 72R, 72G and 72B emit light of wavelength ranges exhibiting red color, green color and blue color, respectively. Any light emitting diodes, satisfying the above requirements, may be used as the light emitting diodes 72R, 72G and 72B, provided that the above conditions are met. For example, such light emitting diodes having the shape of a high dome (High-Dome), low dome (Low-Dome) or a flat (Flat) type, specifying the directivity pattern of the emitted light, may be used.

Shown below are design parameters of the light emitting diodes 72R, 72G and 72B, used for example for the illuminating device 71.

Light emitting diode 72R: red (color of emitted light); 625 nm (center wavelength); Flat (shape); power consumption, 1 W Light emitting diode 72G: green (color of emitted light); 530 nm (center wavelength); Flat (shape); power consumption, 3 W Light emitting diode 72B: royal blue (color of emitted light); 455 nm (center wavelength); Flat (shape); power consumption, 1 W The light condensing lenses 73R, 73G and 73B condense red light rays, green light rays, green light rays and blue light rays, respectively, emitted by the light emitting diodes 72R, 72G and 72B, respectively, to cause these light rays to be incident on the reflective mirror 74, beam splitter plate 75 and on the beam splitter plate 76. The red light rays, green light rays and the blue light rays, emitted by the light emitting diodes 72R, 72G and 72B, respectively, are divergent light rays having directivity such that the light rays are spread out in a radial pattern. Hence, these light rays are refracted by the light condensing lenses 73R, 73G and 73B and thereby turned into collimated light. In actuality, several percent of light is not turned into completely collimated light and is radiated from the light condensing lenses 73R, 73G and 73B as light having a slightly divergent tendency.

Since the light condensing lenses 73 collimate the divergent light, emitted by the light emitting diode 72, the light rays, which otherwise may stray out of the reflective mirror 74 and the beam splitter plates 75, 76 of the downstream side stage, where the red, green and blue light rays are mixed together to form white color as the light rays are guided through the mirror and the respective prisms, may be suppressed from leaking outward in the pre-mixing stage. The result is the improved utilization efficiency of light emitted by the light emitting diodes 72.

The light condensing lenses 73 are each a spherical or an aspherical lens and may be formed of optical glass exemplified by BK-7 (trade name of a product manufactured by SCHOTT), NBFD13 (trade name of a product manufactured by HOYA) or SF1 (trade name of a product manufactured by SCHOTT).

An anti-reflection film (AR coating film) may be applied to the surface of the light condensing lens 73 for lowering the reflectivity on the lens surface and for elevating the transmittance. For example, a single-layer anti-reflection coating by MgF2 or a multi-layer coating by a multi-layer dielectric coating may be applied to the surface of the light condensing lens 73.

Figure 17:
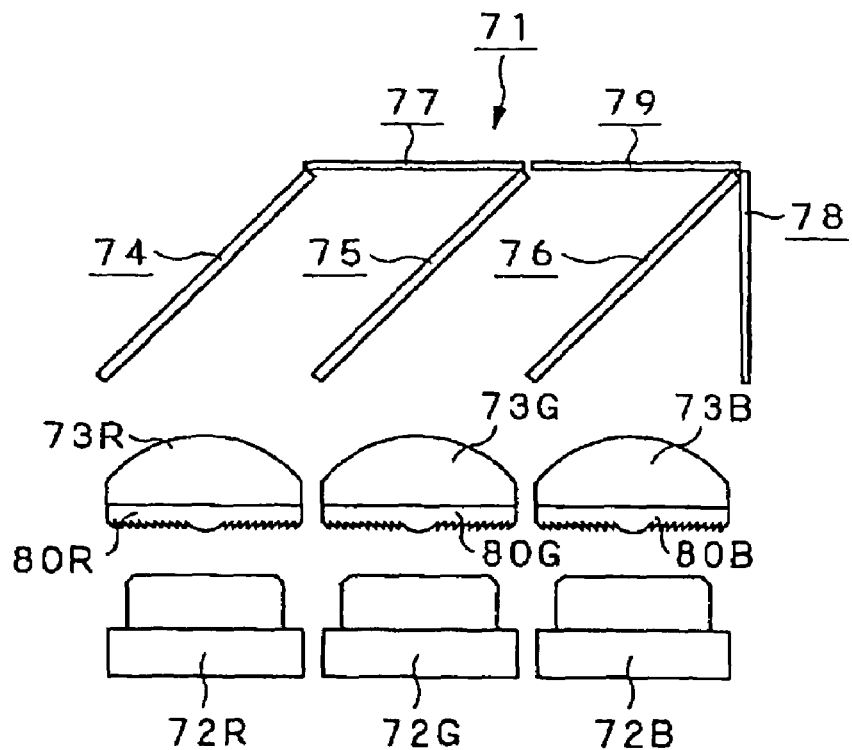
FIG. 17 is a front side view showing an illuminating device which uses a wavelength selecting transmitting/reflecting plate and in which a Fresnel lens is added to the light condensing lens.

On the light incident surface sides of the light condensing lenses 73R, 73G and 73B, there may be mounted Fresnel lenses 80R, 80G and 80B as one with the respective light condensing lenses 73, as shown in FIG. 17. Meanwhile, if there is no necessity for distinguishing the Fresnel lenses 80R, 80G and 80B from one another, they are collectively referred to as Fresnel lenses 80.

The Fresnel lenses 80 are made up by plural concentrically-shaped prisms, formed as plural ring-shaped steps, and are prepared by injection molding the acrylic resin. By arranging the Fresnel lenses 80 in the pre-stage of the light condensing lenses 73, the function of the light condensing lenses 73, that is, the function of refracting the divergent light and thereby turning the light into collimated light, may be displayed efficaciously.

The Fresnel lenses 80 may be used as shown in FIG. 17, independently of whether the light condensing lenses 73 are spherically-shaped lenses or aspherically-shaped lenses. If aspherically-shaped lenses are used as the light condensing lenses 73, and the Fresnel lenses 80 are used, the divergent light may be turned into collimated light more efficaciously.

If the Fresnel lenses 80 are used in this manner in combination with the light condensing lenses 73, the light condensing lenses 73 may be formed of an inexpensive polycarbonate resin, in place of expensive optical glass. If the Fresnel lenses 80 are used in this manner in combination with the light condensing lenses 73, and the light condensing lenses 73 are formed of the polycarbonate resin, it is possible to obtain the favorable effects which are equivalent to those in case of using only the light condensing lenses 73 formed of the optical glass.

The Fresnel lenses 80 may also be coated with anti-reflection films (AR coating films) which are the same as those provided to the light condensing lenses 73 to lower the reflection from the lens surface and to elevate the transmittance.

The light condensing lenses 73 may also be formed as one with the Fresnel lenses 80 so that the Fresnel lenses 80 perform the role of the light incident surfaces. The Fresnel surfaces of the Fresnel lenses 80 may also be spherically-shaped or non-spherically shaped as desired.

Reverting to FIG. 16, explanation of the structure of the illuminating device 71 will be continued. A reflecting surface 74a is formed by providing a reflective film on one surface of a substrate of the reflective mirror 74 formed by, for example, white plate glass. The reflective mirror 74 is arranged on the light radiating surface of the light condensing lens 73R, as described above, so that the reflecting surface 74a as the major surface of the reflective mirror is tilted at an angle of 45° relative to the optical axis of the light condensing lens 73R.

On the reflecting surface 74a of the reflective mirror 74 is applied a reflective film of, for example, aluminum or silver, by vapor deposition, as an example. In case a silver reflective film is applied by vapor deposition on the reflecting surface 74a, a protective film, such as SiO2, is applied by vapor deposition for prohibiting the oxidation of the vapor-deposited silver reflective film. The reflecting surface 74a may be applied as a thin film by vapor-depositing aluminum or silver on a roll paper sheet and bonding the resulting roll paper sheet to the reflective surface. In case a roll paper sheet, on which aluminum or silver has been vapor-deposited, is used, volume production becomes possible because an area which permits vapor deposition at a time is increased.

The reflecting surface 74a of the reflective mirror 74 reflects or totally reflects red light radiated from the light condensing lens 73R to radiate the resulting light to the beam splitter plate 75.

The beam splitter plates 75, 76 are arranged on the light radiating surface sides of the light condensing lenses 73G and 73B, respectively, so that the major surfaces thereof will make an angle of 45° with respect to the optical axes of the light condensing lenses 73G and 73B.

The beam splitter plate 75 includes a wavelength selecting transmitting surface 75a and a wavelength selecting transmitting/reflecting surface 75b. The wavelength selecting transmitting surface transmits the visible light of the wavelength range of red light, emitted by the light emitting diode 72R and reflected by the reflective mirror 74 via light condensing lens 73R, while the wavelength selecting transmitting/reflecting surface further transmits the red light transmitted through the wavelength selecting transmitting surface 75a and reflects the visible light of the wavelength range of green light, emitted by the light emitting diode 72G and incident thereon via light condensing lens 73G.

The beam splitter plate 76 includes a wavelength selecting transmitting surface 76a and a wavelength selecting transmitting/reflecting surface 76b. The wavelength selecting transmitting surface transmits the visible light of the wavelength range of blue light, emitted by the light emitting diode 72B and incident thereon via light condensing lens 73B, while the wavelength selecting transmitting/reflecting surface further transmits the blue light transmitted through the wavelength selecting transmitting surface 76a and for reflecting the red light and the green light, emitted by the light emitting diodes 72R and 72G, respectively, and incident thereon via beam splitter plate 75.

The wavelength selecting transmitting surface 75a and the wavelength selecting transmitting/reflecting surface 75b of the beam splitter plate 75 and the wavelength selecting transmitting surface 76a and the wavelength selecting transmitting/reflecting surface 76b of the beam splitter plate 76 are multi-layer dielectric films formed by thin film forming methods, such as vacuum deposition method or the sputtering method. Hence, the wavelength range for transmission or reflection, that is, the cutoff wavelength range, may be freely selected by forming multi-layer dielectric films as the structure, material type or the film thickness of the layered films is varied in dependence upon the characteristics of the light emitting diodes 72 used.

Thus, by cutting off the wavelength range where red light rays, green light rays and the blue light rays, emitted from the light emitting diodes 72, are overlapped with one another, the white light rays, radiated from the illuminating device 71, may be improved in color purity.

The light emission characteristics of the respective light emitting diodes 72 may be designed so that the wavelength ranges of the respective colors are not overlapped with one another. However, this entails higher costs. With the illuminating device 71, in which the color purity may be controlled by adjusting the multilayer dielectric films, making up the wavelength selecting transmitting surface 75a and the wavelength selecting transmitting/reflecting surface 75b of the beam splitter plate 75 and the wavelength selecting transmitting surface 76a and the wavelength selecting transmitting/reflecting surface 76b of the beam splitter plate 76, it becomes possible to use inexpensive light emitting diodes, exhibiting fluctuations in characteristics, as the light emitting diode 72.

In this manner, the blue light rays are transmitted through the wavelength selecting transmitting surface 76a of the beam splitter plate 76, while the red and green light rays are reflected by the wavelength selecting transmitting/reflecting surface 76b thereof, so that the blue, red and green light rays are mixed together to form white light.

The reflective mirrors 77, 78 are substrates, formed by metal sheets, on one surfaces of which are deposited reflective films to form reflective surfaces 77a and 78a, respectively.

The reflective mirror 77 reflects the red light, radiated from the light condensing lens 73R with a diverging tendency without becoming collimated, and which has not been incident on the reflecting surface 74a of the reflective mirror 74, and the red light, reflected by the reflecting surface 74a of the reflective mirror 74, but which has not been incident on the beam splitter plate 75, to cause the so reflected light to be incident on the wavelength selecting transmitting surface 75a of the beam splitter plate 75.

The reflective mirror 78 reflects the blue light, radiated from the light condensing lens 73B with a diverging tendency without becoming collimated, and which has not been incident on the beam splitter 76, to cause the so reflected light to be incident on the wavelength selecting transmitting surface 76a of the beam splitter plate 76.

On the reflective surfaces 77a, 78a of the reflective mirrors 77, 78, there are deposited reflective films of, for example, aluminum or silver. In case the silver reflective films are vapor-deposited on the reflective surfaces 77a, 78a, protective films of, for example, SiO2, are further vapor-deposited for preventing the oxidation of the vapor-deposited silver reflective films. The reflecting surface 77a may be applied as a thin film by vapor-depositing aluminum or silver on a roll paper sheet and by bonding the resulting roll paper sheet to the reflective surface. In case a roll paper sheet, on which aluminum or silver has been vapor-deposited, is used, volume production becomes possible because an area which permits vapor deposition at a time is increased.

The optical plate 79 includes a plate-shaped substrate, formed of, for example, optical glass or acrylic resin, such as polymethyl methacrylate (PMMA), and an optical surface 79a comprised of an optical thin film deposited on the substrate. The optical surface 79a exhibits incident angle dependency such that whether the incident light is transmitted or reflected is determined in dependence upon the angle of incidence of light on the optical surface 79a. The optical surface 79a reflects the incident light in case the angle of incidence of light on the optical surface 79a is larger than a preset value and transmits the light otherwise.

For example, the white light, obtained on mixing the red, green and blue light rays, radiated from the beam splitter plate 76, is incident on the optical surface 79a at an angle of incidence of 0° or thereabouts. The optical surface 79a of the optical plate 79 transmits and radiates the white light.

Out of the red light rays, transmitted through the beam splitter plate 75, and the green light rays, reflected by the beam splitter plate 75, the light rays radiated from the beam splitter plate with a diverging tendency, are incident on the optical surface 79a of the optical plate 79 at an angle of incidence larger than that of the aforementioned white light. The optical surface 79a of the optical plate 79 reflects these red and green light rays to cause the so reflected light rays to be incident on the wavelength selecting transmitting/reflecting surface 76b of the beam splitter plate 76.

The red and green light rays, reflected by the optical surface 79a of the optical plate 79 to fall on the wavelength selecting transmitting/reflecting surface 76b of the beam splitter plate 76, are reflected and mixed with blue light rays transmitted through the wavelength selecting transmitting surface 76a to form white light.

Hence, the optical surface 79a of the optical plate 79, transmitting or reflecting the incident light rays depending on the angle of incidence, is able to make the best use of the red and green light rays, which may otherwise leak from the beam splitter plate 76, to render it possible to improve the utilization efficiency of light emitted from the light emitting diodes 72.

The optical surface 79a of the optical plate 79 is a multi-layer dielectric film formed by thin film forming techniques, such as vacuum vapor deposition method or sputtering method. An anti-reflection film (AR coating film) may be applied to the optical surface 79a of the optical plate 79 to lower surface reflection to elevate transmittance.

The beam splitter plate 75 transmits the red light rays, emitted by the light emitting diode 72R and incident on the beam splitter plate via light condensing lens 73 and reflective mirror 74, by the wavelength selecting transmitting surface 75a and the wavelength selecting transmitting/reflecting surface 75b.

The beam splitter plate 75 also reflects the green light, emitted by the light emitting diode 72G and incident thereon via light condensing lens 73G, by the wavelength selecting transmitting/reflecting surface 75b.

The beam splitter plate 76 transmits the blue light rays, emitted by the light emitting diode 72B and incident thereon via light condensing lens 73B, by the wavelength selecting transmitting surface 76a and the wavelength selecting transmitting/reflecting surface 76b, while reflecting the red light rays, transmitted through the beam splitter plate 75, and the green light rays, reflected by the beam splitter plate 75, by the wavelength selecting transmitting/reflecting surface 76b, to form white light obtained by mixing blue, red and blue light rays, to radiate the so formed white light.

In the above-described illuminating device 71, the optical component 31, 32, 33 or 34, used for adapting the illuminating device 21 to the thickness of the light guide plate 10, explained with reference to FIGS. 5 to 8, may be used. In the illuminating device 71, the optical component 31, 32, 33 or 34 is provided in rear of the optical plate 79.

With the illuminating device 71 including the optical component 31, 32, 33 or 34, in this manner, the front surface luminance of white light, radiated from the light radiating surface 12 of the light guide plate 10, may be drastically improved.

The illuminating device 71 does not use prisms, which are expensive optical components, in contradistinction from the illuminating devices 21, 61, and hence may be prepared at a low cost. For example, in preparing the illuminating device 71 at a low cost with high light utilization efficiency, the illuminating device may be fitted with the light condensing lens 73 and a Fresnel lens 80, as shown in FIG. 17.

With the illuminating device 71, employing the Fresnel lens 80, the light condensing lens may be formed of inexpensive polycarbonate resin, and hence the illuminating device may be prepared at extremely low costs.

The illuminating device 71, explained with reference to FIGS. 16 and 17, uses a plate having a wavelength selecting transmitting/reflecting surface as color mixing means for mixing red, green and blue light rays, emitted by the light emitting diodes, to form white light. In similar manner, a plate having a wavelength selecting transmitting/reflecting surface may be used to constitute an illuminating device 81 shown in FIG. 18.

Figure 18:
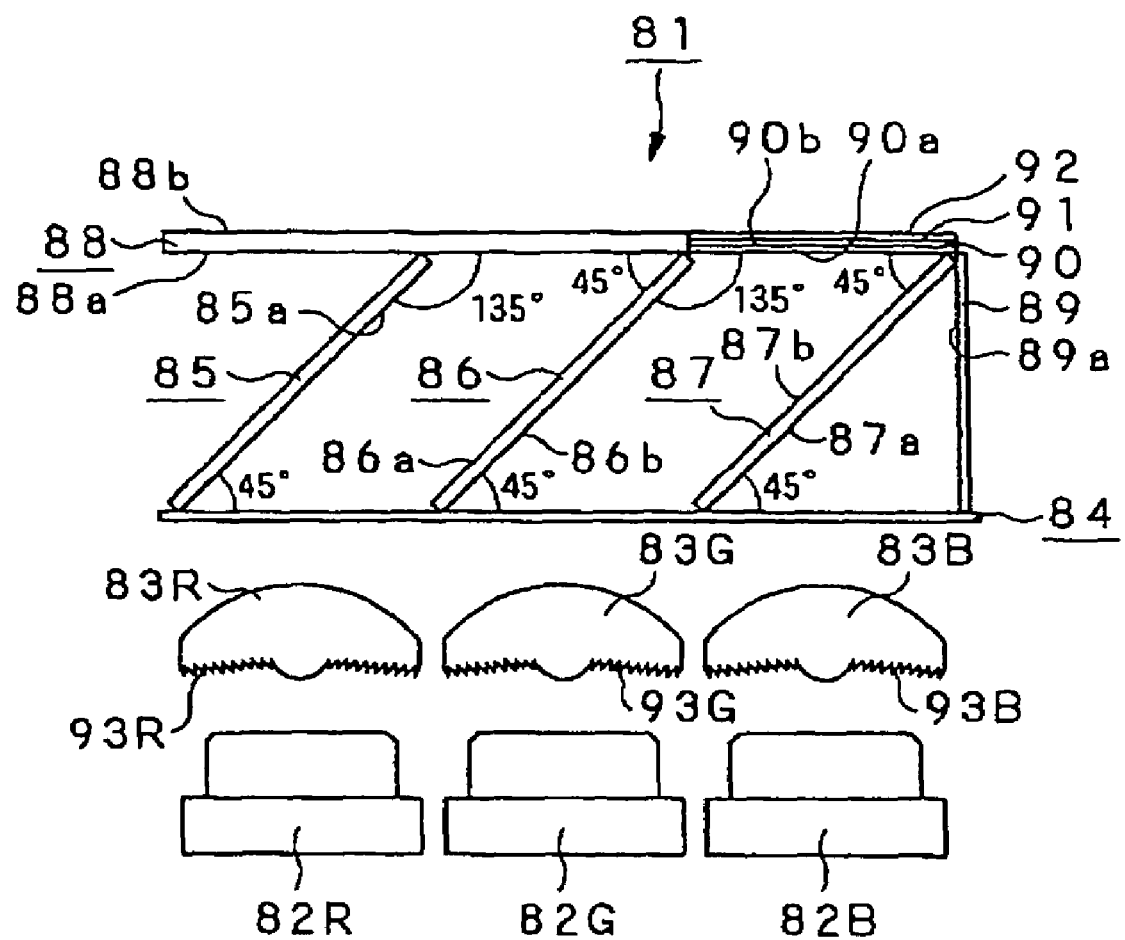
FIG. 18 is a front side view showing another illuminating device which uses a wavelength selecting transmitting/reflecting plate.
Figure 19:
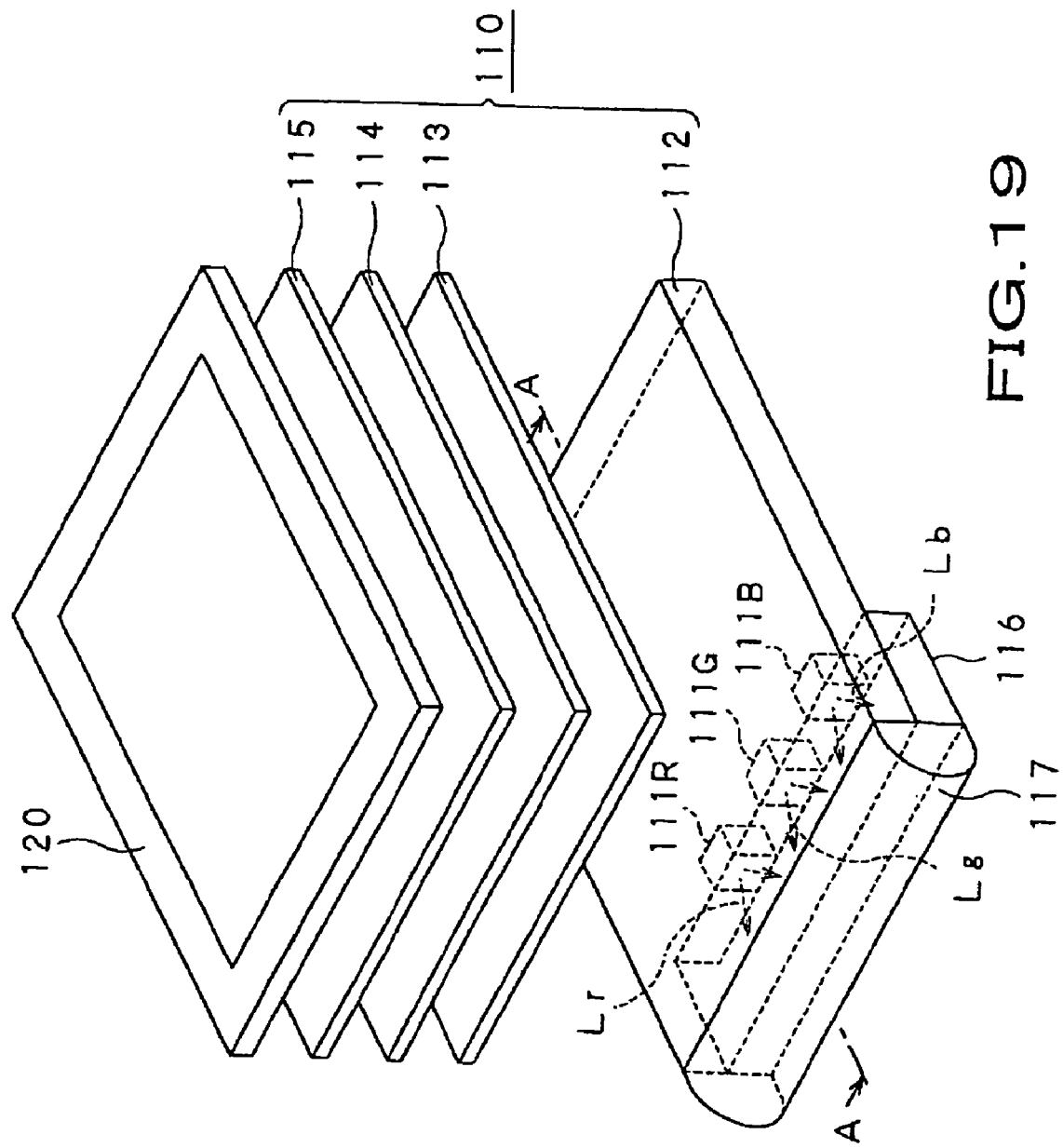
FIG. 19 is an exploded perspective view showing a conventional backlight unit.
Figure 20:
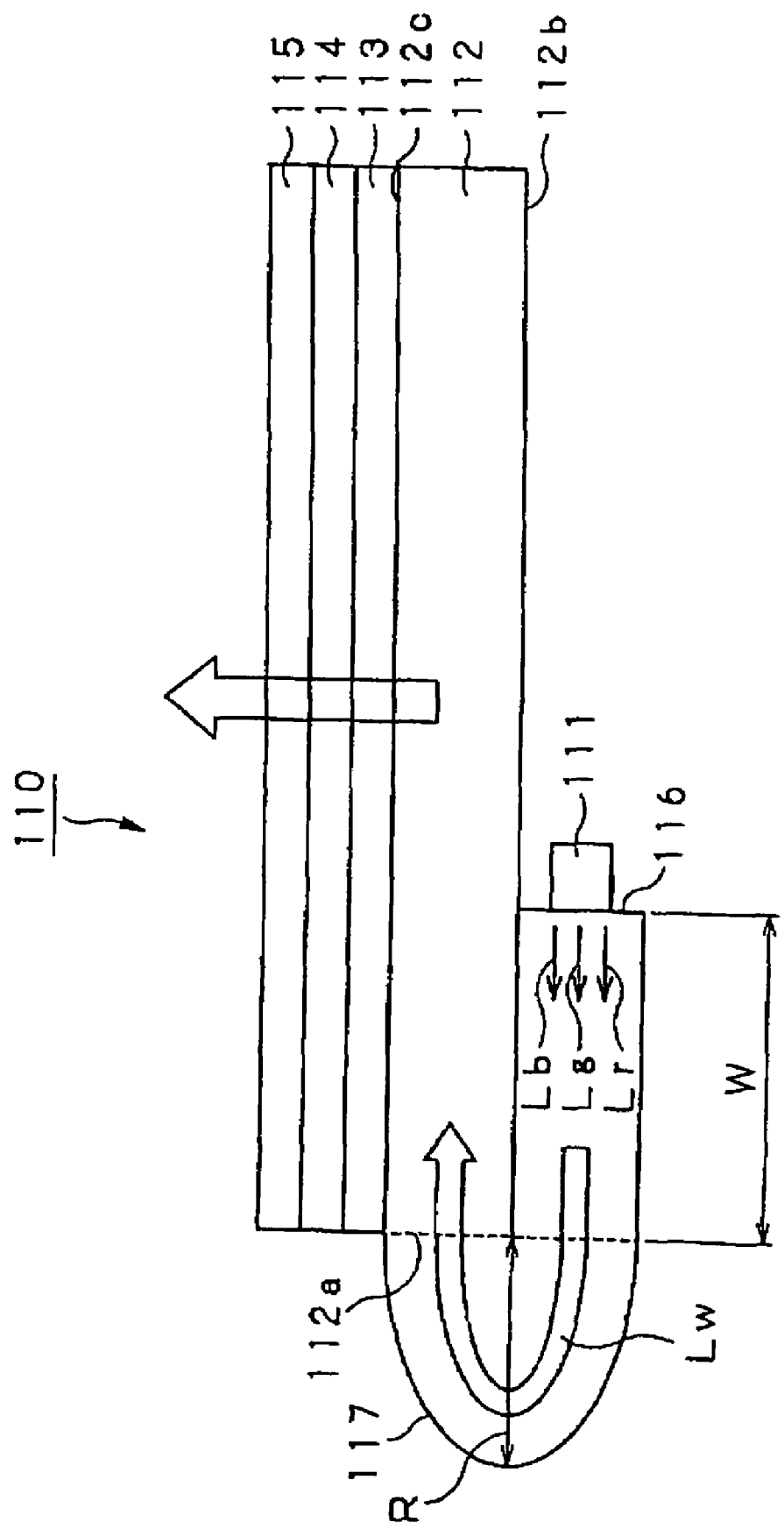
FIG. 20 is a cross-sectional view showing the conventional backlight unit.

The illuminating device 81, shown in FIG. 18, includes light emitting diodes 82R, 82G and 82B, light condensing lenses 83R, 83G and 83B, arranged on the light radiating surface sides of the light emitting diodes 82R, 82G and 82B, respectively, an optical plate 84, arranged on the light radiating surface sides of the light condensing lenses 83R, 83G and 83B, a flat-plate-shaped reflective mirror 85 and flat-plate-shaped beam splitter plates 86, 87, arranged on the light radiating surface sides of the light condensing lenses 83R, 83G and 83B, respectively, with the optical plate 84 in-between, flat-plate-shaped reflective mirrors 88, 89, and a flat-plate-shaped optical plate 90.

In case the light emitting diodes 82R, 82G and 82B do not have to be distinguished from one another or the light condensing lenses 83R, 83G and 83B do not have to be distinguished from one another, they are collectively referred to as light emitting diodes 82 and light condensing lenses 83, respectively.

The reflective mirror 85 and flat-plate-shaped beam splitter plates 86, 87 are arranged in rear of the light condensing lenses 83R, 83G and 83B, respectively, with the interposition of the optical plate 84, so that respective major surfaces thereof are tilted at an angle of 45° relative to the optical axes of the light condensing lenses 83R, 83G and 83B. The reflective mirror 85 and flat-plate-shaped beam splitter plates 86, 87 are arranged parallel to one another, as the aforementioned tilt angle is maintained, as shown in FIG. 18.

The reflective mirror 88 is arranged with its reflective surface 88a facing the light condensing lenses 83 and being inclined at an angle of 135° relative to the reflective mirror 85 and at an angle of 45° relative to the beam splitter plate 86. The reflective mirror 88 is larger in size than the reflective mirror 77 provided to the illuminating device 71 and has an area just large enough to cover up the light condensing lens 83R.

The reflective mirror 89 is arranged facing the beam splitter plate 87 so that its reflective surface 89a is parallel to the optical axis of the light condensing lens 83B and inclined at an angle of 45° relative to the beam splitter plate 87.

The optical plate 90 is arranged with its optical surface 90a facing the light condensing lens 83 and is inclined 135° and at an angle of 45° relative to the beam splitter plate 86 and 87, respectively.

The light emitting diodes 82R, 82G and 82B emit light rays of wavelength ranges exhibiting red color, green color and blue color, respectively. Any light emitting diodes, satisfying the above requirements, may be used as the light emitting diodes 82R, 82G and 82B. For example, such light emitting diodes having the shape of the high dome (High-Dome), low dome (Low-Dome) or the flat (Flat) type, specifying the directivity pattern of the emitted light, may be used.

Shown below are design parameters of the light emitting diodes 82R, 82G and 82B, used for example for the illuminating device 81.

Light emitting diode 82R: red (color of emitted light); 625 nm (center wavelength); Low-Dome (shape); power consumption, 1 W Light emitting diode 82G: green (color of emitted light); 530 nm (center wavelength); Low-Dome (shape); power consumption, 3 W Light emitting diode 82B: royal blue (color of emitted light); 455 nm (center wavelength); Low-Dome (shape); power consumption, 1 W The light condensing lenses 83R, 83G and 83B condense red light rays, green light rays and blue light rays, respectively, emitted by the light emitting diodes 82R, 82G and 82B, respectively, to cause these light rays to be incident on the reflective mirror 85, beam splitter plate 86 and on the beam splitter plate 87 via optical plate 84, respectively.

Since the red light rays, green light rays and the blue light rays, emitted by the light emitting diodes 82R, 82G and 82B, respectively, are divergent light having directivity such that the light rays proceed as they are spread out in a radial pattern, these light rays are refracted by the light condensing lenses 83R, 83G and 83B and thereby turned into collimated light. In actuality, several percent of light is not turned into completely collimated light and is radiated from the light condensing lenses 83R, 83G and 83B as light having slightly divergent tendency.

Since the light condensing lenses 83 collimate the divergent light, emitted by the light emitting diodes 82, the light rays, which otherwise may stray out of the reflective mirror 85 and the beam splitter plates 86, 87 of the downstream side stage, where the light mixed to form white color is guided through the respective prisms, may be suppressed from leaking outward in a pre-mixing stage. The result is the improved utilization efficiency of light emitted by the light emitting diodes 82.

The light condensing lens 83 is a spherical or an aspherical lens and may be formed of optical glass exemplified by BK-7 (trade name of a product manufactured by SCHOTT), NBFD13 (trade name of a product manufactured by HOYA) or SF1 (trade name of a product manufactured by SCHOTT).

An anti-reflection film (AR coating film) may be applied to the surface of the light condensing lens 83 for lowering the reflection on the lens surface and for elevating the transmittance. For example, a single-layer anti-reflection coating by MgF2 or a multi-layer coating by a multi-layer dielectric coating may be applied to the surface of the light condensing lens 83.

On the light incident surface sides of the light condensing lenses 83R, 83G and 83B, there may be mounted Fresnel lenses 93R, 93G and 93B, as shown in FIG. 18. The Fresnel lens 93 is obtained by layering plural concentrically-shaped prisms in the form of ring-shaped steps. Meanwhile, if there is no necessity for distinguishing the Fresnel lenses 93R, 93G and 93B from one another, they are collectively referred to as Fresnel lenses 93.

By forming these Fresnel lenses 93 on the light incident surfaces of the light condensing lenses 83, as shown in FIG. 18, the function of the light condensing lenses 93, that is, the function of refracting the divergent light so as to form collimated light, may be displayed efficaciously.

The Fresnel lenses 93, formed on the light incident surfaces of the light condensing lenses 83, may be formed as shown in FIG. 18, without dependency on whether the light condensing lenses 83 are spherical lenses or aspherical lenses. The Fresnel surfaces of the Fresnel lenses 93 may be spherically-shaped or aspherically-shaped, as desired.

In case the light condensing lenses 83 are aspherical lenses and the Fresnel lenses 93 are formed on the light incident surface sides of the light condensing lenses 83, the divergent light may be turned more efficaciously into collimated light.

When the Fresnel lenses 93 are formed in this manner on the light incident surfaces of the light condensing lenses 83, an inexpensive polycarbonate resin may be used in place of the expensive optical glass as a material for the light condensing lenses 83. In case the Fresnel lenses 93 are formed on the light incident surface sides of the light condensing lenses 83, the favorable effects equivalent to those in case of using only the light condensing lenses 83 molded from optical glass may be achieved even in case the light condensing lenses 83 are molded from the polycarbonate resin.

The Fresnel lenses 93 may each be provided with an anti-reflection film (AR coating film) for lowering the reflection from the lens surface and for elevating the transmittance.

The reflective mirror 85 includes a reflective surface 85a by providing a reflective film on one surface of a substrate formed by, for example, a white glass plate. The reflective mirror 85 is arranged on the light radiating side of the light condensing lens 83R, so that the reflective surface 85a as the major surface thereof is inclined at an angle of 45° with respect to the optical axis of the light condensing lens 83R, as described above.

On the reflective surface 85a of the reflective mirror 85, there is vapor-deposited a reflective film of, for example, aluminum or silver. In case a silver reflective film is vapor-deposited on the reflective surface 85a, a protective film of, for example, SiO2, may be vapor-deposited for preventing oxidation of the silver reflective film. The reflective surface 85a may be prepared by vapor-depositing aluminum or silver on a roll paper sheet to form a thin film and by bonding the so formed thin film on the reflective mirror. In case a roll paper sheet carrying vapor-deposited aluminum or silver is used, it is possible to increase the area on which to vapor deposit aluminum or silver at a time, thus enabling volume production.

Alternatively, the reflective mirror 85 may be formed by vapor-depositing the aforementioned reflective film on a transparent film having a thickness, such as 200 to 300 μm, which will permit the film to support itself even when the film is arranged as described above.

In any of the above cases, a reflection augmenting film may be vapor-deposited on a metal reflective film for further elevating the reflectance of the vapor-deposited metal reflective film.

The reflective surface 85a of the reflective mirror 85 reflects or totally reflects the red light, radiated from the light condensing lens 83R, to radiate the light towards the beam splitter plate 86.

The beam splitter plates 86, 87 are arranged on the light radiating surface sides of the light condensing lenses 83G and 83B, respectively, so that the major surfaces of the beam splitter plates are tilted at an angle of 45° with respect to the optical axes of the light condensing lenses 83G and 83B, respectively.

The beam splitter plate 86 includes a wavelength selecting transmitting surface 86a and a wavelength selecting transmitting/reflecting surface 86b. The wavelength selecting transmitting surface transmits the visible light of a wavelength range of red light rays, emitted by the light emitting diode 82R and reflected by the reflective mirror 85 via light condensing lens 83R, while the wavelength selecting transmitting/reflecting surface further transmits the red light rays, transmitted through the wavelength selecting transmitting surface 86a, while reflecting the visible light of a wavelength range of green light rays, emitted by the light emitting diode 82G and incident thereon via light condensing lens 83G.

The beam splitter plate 87 includes a wavelength selecting transmitting surface 87a for transmitting the visible light of a wavelength range of blue light rays emitted by the light emitting diode 82B and incident thereon via light condensing lens 83B, and a wavelength selecting transmitting/reflecting surface 87b for further transmitting the blue light rays, transmitted through the wavelength selecting transmitting surface 87a, and for reflecting the red and green light rays, emitted by the light emitting diodes 82R and 82G, respectively, and radiated from the beam splitter plate 86.

The wavelength selecting transmitting surface 86a and the wavelength selecting transmitting/reflecting surface 86b of the beam splitter plate 86 and the wavelength selecting transmitting surface 87a and the wavelength selecting transmitting/reflecting surface 87b of the beam splitter plate 87 are multi-layer dielectric films, formed by thin film forming methods, such as vacuum deposition method or sputtering method. Hence, the wavelength range of transmission and reflection, that is, the cut-off wavelength range, may freely be controlled by varying the film structure, material type or the film thickness of the layered films, depending on, for example, the characteristics of the light emitting diodes 82 used.

In this manner, the wavelength ranges, where the red light rays, green light rays and the blue light rays, emitted from the respective light emitting diodes 82, are overlapped with one another, may be cut off to elevate the color purity of white light radiated from the illuminating device 81.

Although the light emitting characteristics of the respective light emitting diodes 82 may be designed so that the wavelength ranges of the diodes are not overlapped with one another, this designing may turn out to be extremely costly. With the illuminating device 81, the multi-layer dielectric films, making up the wavelength selecting transmitting surface 86a and the wavelength selecting transmitting/reflecting surface 86b of the beam splitter plate 86 and the wavelength selecting transmitting surface 87a and the wavelength selecting transmitting/reflecting surface 87b of the beam splitter plate 87, may be adjusted to control the color purity. Thus, light emitting diodes, available at low cost, exhibiting variations in characteristics, may be used as the light emitting diodes 82.

Hence, by the wavelength selecting transmitting surface 87a of the beam splitter plate 87 transmitting the blue light rays and by the wavelength selecting transmitting/reflecting surface 87b thereof reflecting the red and green light rays, the blue, red and green light rays may be mixed together to form white light.

The reflective mirror 88 is comprised of a substrate of, for example, a metal sheet, on both sides of which are formed reflective films to form reflective surfaces 88a and 88b.

The reflective mirror 88 reflects, by its reflective surface 88a, the red light rays, radiated from the light condensing lens 83R with a diverging tendency without becoming collimated, and which has not been incident on the reflecting surface 85a of the reflective mirror 85, and the light rays, reflected by the reflecting surface 85a of the reflective mirror 85, but which has not been incident on the beam splitter plate 86, to cause the so reflected light to be incident on the wavelength selecting transmitting surface 86a of the beam splitter plate 86.

The other reflective surface 88b of the reflective mirror 88 is arranged on the light incident surface 11A or 11B of the light guide plate 10 when the illuminating device 81 is mounted on the light guide plate 10. This reflective surface 88b gives the same favorable effects as those of the reflective area 6 formed on the light incident surface 11A or 11B of the light guide plate 10, as explained with reference to FIG. 10.

That is, the other reflective surface 88b suppresses the white light, incident on and guided by the light guide plate 10 and which has as yet not been radiated from the light radiating surface 12, from leaking outwards from the light guide plate 10, by reflection, thereby appreciably improving the utilization efficiency of light emitted by the light emitting diodes 82.

The reflective mirror 89 is comprised of a substrate of, for example, a metal sheet, on one surface side of which is formed a reflective film to form the reflective surface 89a.

The reflective mirror 89 reflects the blue light rays, radiated from the light condensing lens 83B with a diverging tendency without becoming collimated, and which has not been incident on the beam splitter plate 87, to cause the so reflected light on the wavelength selecting transmitting surface 87a of the beam splitter plate 87.

The reflective surfaces 88a, 88b and 89a of the reflective mirrors 88 and 89 are formed by vapor-depositing reflective films of aluminum or silver on respective substrates. If the reflective surfaces 88a, 88b and 89a are formed by vapor-depositing silver reflective films, protective films of, for example, SiO2, in order to prevent the oxidation of the vapor-deposited reflective films. The reflective surfaces 88a, 88b and 89a may also be formed by bonding roll paper sheets, carrying aluminum or silver, vapor-deposited thereon, to the substrate surface and by transcribing the aluminum or silver to the substrate surface. In case the roll paper sheet, on which aluminum or silver has been vapor-deposited, is used, the reflective films may be produced in larger quantities at a time because an area which permits vapor deposition at a time is increased.

The optical plate 90 is comprised of a substrate, formed of, for example, optical glass or acrylic resin, such as polymethyl methacrylate (PMMA), and an optical thin film, deposited thereon to form an optical surface 90a. The optical surface 90a exhibits incident angle dependency such that whether the incident light is transmitted or reflected is determined in dependence upon the angle of incidence of the incident light. The optical surface 90a reflects the incident light if the angle of incidence of the incident light is larger than a preset value, while transmitting the light if otherwise.

For example, the white light, obtained by mixing the red, green and blue light rays, radiated from the beam splitter plate 87, is incident on the optical surface 90a at an angle of incidence of 0° or thereabouts. The optical surface 90a of the optical plate 90 transmits and radiates the white light.

On the other hand, the red light rays, transmitted through the beam splitter plate 86, and the green light rays, reflected by the beam splitter plate 86 and radiated with a diverging tendency, are incident on the optical surface 90a of the optical plate 90 at an angle of incidence larger than that of the aforementioned white light. The optical surface 90a of the optical plate 90 reflects the red and green light rays to cause these light rays to be incident on the wavelength selecting transmitting/reflecting surface 87b of the beam splitter plate 87.

The red and green light rays, reflected by the optical surface 90a of the optical plate 90 and incident on the wavelength selecting transmitting/reflecting surface 87b of the beam splitter plate 87, are reflected and mixed with blue light rays transmitted through the wavelength selecting transmitting surface 87a to form white light.

Since the optical surface 90a of the optical plate 90, transmitting light rays in dependence upon the angle of incidence of the light rays, is able to make the best use of the components of the red and green light rays, otherwise leaking outwards from the beam splitter plate 87, the light emitted from the light emitting diodes 82 may be utilized efficaciously.

The optical surface 90a of the optical plate 90 is formed by a multilayer dielectric film formed by a thin film forming technique, such as vacuum deposition method or sputtering method. The optical surface 90a of the optical plate 90 may be coated with an anti-reflection film (AR coating film), for lowering the reflection and for elevating the transmittance.

On a light radiating surface 90b of the optical plate 90, there may be formed light diffusing areas 5, formed on the light incident surfaces 11A, 11B of the light guide plate 10, explained with reference to FIGS. 10 and 11, in a similar manner. The light diffusing areas of the illuminating device 81 are formed by bonding a first prism sheet 91 and a second prism sheet 92 on the light radiating surface 90b, as an example, to yield the light diffusing effect of diffusing the white light, obtained on color mixing, in the in-plane direction of the light guide plate 10. The present invention is not limited to this combination of sheets, such that any suitable sheets may be used, either alone or in combination, provided that sheets used are efficacious in diffusing the light as described above.

As the first prism sheet 91 and the second prism sheet 93, such films as BEFF series (trade name of the product manufactured by SUMITOMO 3M), RBEFF series (trade name of the product manufactured by SUMITOMO 3M) or DBEFF series (trade name of the product manufactured by SUMITOMO 3M), capable of improving the luminance, may be used.

The beam splitter plate 86 transmits the red light, emitted by the light emitting diode 82R and incident thereon via light condensing lens 83, optical plate 84 and reflective mirror 85, through its wavelength selecting transmitting surface 86a and its wavelength selecting transmitting/reflecting surface 86b.

The beam splitter plate 86 also reflects the green light, emitted by the light emitting diode 82G and incident thereon via light condensing lens 83G and optical plate 84, by its wavelength selecting transmitting/reflecting surface 86b.

The beam splitter plate 87 transmits the blue light rays, emitted by the light emitting diode 82B and incident thereon via light condensing lens 83B and the optical plate 84, by its wavelength selecting transmitting surface 87a and wavelength selecting transmitting/reflecting surface 87b, while reflecting the red and green light rays, transmitted through the beam splitter plate 86, by its wavelength selecting transmitting/reflecting surface 87b, to generate white light mixed from the blue, red and green light rays, to radiate the so generated white light.

In the above-described illuminating device 81, the optical component 31, 32, 33 or 34, adapting the illuminating device 21 to the thickness of the light guide plate 10, as explained with reference to FIGS. 5 to 8, may be used. In the illuminating device 81, the optical component 31, 32, 33 or 34 is provided in rear of the light radiating surface 90b of the optical plate 90, having bonded thereto the first and second prism sheets 91 and 92.

With the illuminating device 81 thus including the optical component 31, 32, 33 or 34, the front surface luminance of white light, radiated with in-plane light radiation from the light radiating surface 12 of the light guide plate 10, may be improved significantly.

When the backlight unit is formed using the illuminating device 61, 71 or 81, explained with reference to FIGS. 14 to 18, and the light guide plate 10, any disposition layout for arranging the illuminating device 21 with respect to the light guide plate 10, shown in FIGS. 9, 12 or 13, may be used. Since the light diffusing areas 5, reflecting areas 6 or the reflecting surface 7, provided to the light incident surfaces 11A or 11B, may be formed in similar manner, luminance fluctuations may be suppressed to provide for uniform in-plane light radiation, thereby appreciably improving the utilization efficiency of light emitted by the light emitting diodes provided to the respective illuminating devices.

When the backlight unit is formed using the illuminating device 21, 61, 71 or 81, and used for illuminating a liquid crystal display panel, having color filters, approximately 100 to 120% of the range of chromaticity of the NTSC (National Television System Committee) system in the CIE chromaticity diagram, may be reproduced, such that it becomes possible to cope with the color reproducibility range of sYCC which is a color space of a color gamut wider than that of NTSC.

It is to be noted that the present invention is not limited to the so-called edge-lit type backlight unit in which light is incident from the lateral side of the light guide plate 10, and may, for example, be applied to a subjacent backlight unit in which the illuminating device is arranged directly below the light guide plate also operating as the light diffusing plate.

The present invention is not limited to the embodiments described above with reference to the drawings and, as may be apparent to those skilled in the art, various changes or substitution by equivalents may be attempted without departing from the scope of the invention as defined in the appended claims.

INDUSTRIAL APPLICABILITY

The illuminating device according to the present invention may be used as a light source of a backlight device, which backlight device may, in turn, be used as a light source of a liquid crystal display.

The invention claimed is:

1. A backlight device including a light guide plate guiding the light rays incident thereon from a light incident surface thereof as said light rays undergo total reflection on a light radiating surface and a light reflecting surface as one and the other of the major surfaces of the light guide plate, said light guide surface radiating the light rays by in-plane light radiation from said light radiating surface, said backlight device comprising a plurality of illuminating devices provided at a preset interval on the light incident surface side of said light guide plate, said illuminating devices each including a first light source for radiating light rays of a first prime color;

a second light source for radiating light rays of a second prime color and a third light source for radiating light rays of a third prime color, said first, second and third light sources being arrayed in the same plane;

respective optical means for collimating divergent light rays, contained in said light rays of the first prime color, radiated from said first light source, said light rays of the second prime color, radiated from said second light source and in said light rays of the third prime color, radiated from said third light source; and color mixing means for color mixing said light rays of the first prime color, said light rays of the second prime color and said light rays of the third prime color, radiated from said optical means, by selective transmission and reflection, based on optical properties of the light rays of the respective prime colors, and for radiating the mixed light rays as white light.

2. The backlight according to claim 1 wherein said illuminating device includes an opticai component for guiding said white light obtained on color mixing by said color mixing means so that, when said white light is incident on said light incident surface of said light guide plate, the totality of the white light radiated from said color mixing means will be incident on said light incident surface of said light guide plate.

3. The backlight device according to claim 1 wherein said first, second and third light sources possessed by said illuminating device are light emitting diodes (LEDs).

4. The backlight device according to claim 1 wherein said light incident surface of said light guide plate comprises a pair of opposite lateral sides thereof.

5. The backlight device according to claim 4 wherein, in case said light guide plate comprises a pair of opposite lateral sides of said light guide plate, as said light incident surface, the plural illuminating devices arranged at said preset interval on one of said light incident surfaces and the plural illuminating devices arranged at said preset interval on the other of said light incident surfaces are arranged so that the white light radiating surfaces of said illuminating devices radiating said white light are arrayed with an offset of one half pitch, without facing one another, with said light guide plate in-between.

6. The backlight device according to claim 1 wherein said light incident surface of said light guide plate is one of lateral sides thereof.

7. The backlight device according to claim 1 wherein a light diffusing area is provided on said light incident surface of said light guide plate for changing the directivity of said white light obtained on color mixing by said color mixing means of said illuminating device so that said white light is diffused along the in-plane direction of said light guide plate.

8. The backlight device according to claim 7 wherein said light diffusing area is formed by bonding a light diffusing sheet and a prism sheet in superposition on said light incident surface of said light guide plate.

9. The backlight device according to claim 7 wherein a reflecting area is provided in a region other than said light difibsing area on said light incident surface for reflecting the white light guided in said light guide plate so that said white light guided will not leak outward from said light guide plate.

10. The backlight device according to claim 9 wherein said reflecting area is formed by bonding a reflective sheet in place.

11. A backlight device including a light guide plate guiding the light rays incident thereon from a light incident surface thereof as said light rays undergo total reflection on a light radiating surface and a light reflecting surface as one and the other of the major surfaces of the light guide plate, said light guide surface radiating the light rays by in-plane light radiation from said light radiating surface, said backlight device comprising
- a plurality of illuminating devices provided at a preset interval on the light incident surface side of said light guide plate, said illuminating devices each including
- a first light source for radiating light rays of a first prime color;
- a second light source for radiating light rays of a second prime color;
- a third light source for radiating light rays of a third prime color;
- a first lens for refracting divergent light rays contained in said light rays of the first prime color radiated from said first light source;
- a second lens for refracting divergent light rays contained in said light rays of the second prime color radiated from said second light source;
- a third lens for refracting divergent light rays contained in said light rays of the third prime color radiated from said third light source, said, first, second and third light sources being arrayed in the same plane;
- a first triangular prism having a first light reflecting surfhce for reflecting said light rays of the first prime color radiated via said first lens;
- a second triangular prism having a second light reflecting surface for reflecting said light rays of the second prime color radiated via said second lens; and
- a diobroic prism having a first wavelength selecting transmitting/reflecting surface and a second wavelength selecting transmitting reflecting surface, arranged for intersecting each other in the configuration of a letter X, said first wavelength selecting transmitting/reflecting surface transmitting said light rays of the third prime color radiated via said third lens and reflecting said light rays of the first prime color reflected by said first light reflecting surface of said first triangular prism; said second wavelength selecting transmitting reflecting surface transmitting said light rays of the third prime color radiated via said third lens and reflecting the light rays of said second prime color reflected by said second light reflecting surface of said second triangular prism; said diobroic prism mixing said light rays of the first to third prime colors to form white light, and radiating the so formed white light;
- said dichroic prism, said first triangular prism and the second triangular prism being arranged close to one another with the interposition of an air layer.

12. The backlight device according to claim 11 wherein said illuminating device includes an optical component which, when said white light obtained on color mixing by said dicbroic prism is incident on said light incident surface of said light guide plate, guides said white light, radiated from said dicbroic prism, so that the totality of said white light will be incident on said light incident surface of said light guide plate.

13. The backlight device according to claim 12 wherein said optical component is an optical block including a white light incident surface of the same shape as a light radiating surface of said dichroic prism radiating the white light, said white light radiated from said light radiating surface being incident on said white light incident surface, a white light radiating surface arranged opposite to said white light incident surface and having at least one side of a length equal to the thickness of said light guide plate, and a pair of reflective surfaces arranged with a preset tilt with respect to the direction of thickness of said light guide plate and adapted for guiding said white light incident from said white light incident surfhce to said white light radiating surface as said white light undergoes total reflection.

14. The backlight device according to claim 12 wherein said optical component is a pair of reflective mirrors arranged with a preset tilt with respect to the direction of thickness of the light guide plate and adapted for guiding the white light radiated from the light radiating surface of said dichroic prism to said light incident surface of said light guide plate as said white light is reflected.

15. The backlight device according to claim 12 wherein said optical component is an optical block unit made up of a first optical block and a second optical block arrayed along the direction of thickness of said light guide plate;
- said first optical block including a first white light incident surface on which is incident said white light radiated from a light radiating surface of said dichroic prism, a first white light radiating surface arranged opposite to said first white light incident surface and having at least one side of a length not larger than the thickness of said light guide plate, and a pair of first reflective surfaces arranged with a preset tilt with respect to the direction of thickness of said light guide plate and adapted for guiding said white light incident from said first white light incident surface to said first white light radiating surface as said white light undergoes total reflection;
- said second optical block including a second white light incident surface on which is incident said white light radiated from said light radiating surface of said dicbroic prism, a second white light radiating surface arranged opposite to said white light incident surface and having at least one side of a length not larger than the thickness of said light guide plate, and a pair of second reflective surfaces arranged with a preset tilt with respect to the direction of thickness of said light guide plate and adapted for guiding said white light incident from said second white light incident surface to said second white light radiating surface as said white light undergoes total reflection; and wherein
- a white light incident surfhce of said optical block, formed by said first and second light incident surfaces, is of the same shape as said light radiating surface of said dichroic prism; said first and second light radiating surfaces being arranged so as to be confined within said light incident surface of said light guide plate.

16. The backlight device according to claim 11 wherein said first lens, second lens and the third lens, possessed by said illuminating device, are spherical or aspherical lenses.

17. The backlight device according to claim 11 wherein said first lens, second lens and the third lens, possessed by said illuminating device, are provided with Fresnel lenses on light incident surfaces thereof.

18. The backlight device according to claim 11 wherein said first light source, second light source and the third light source, possessed by said illuminating device, are light emitting diodes (LEDs).

19. The backlight device according to claim 11 wherein said light incident surface of said light guide plate is a pair of opposite lateral sides thereof.

20. The backlight device according to claim 19 wherein, said light guide plate comprises a pair of opposite lateral sides as light incident surfaces, the white light radiating surfaces of the plural illuminating devices arranged at said preset interval on one of said light incident surfaces and the white light radiating surfaces of the plural illuminating devices arranged at said preset interval on the other of said light incident surfaces are arrayed with an offset of one half pitch, without facing one another, with said light guide plate in-between.

21. The backlight device according to claim 11 wherein said light incident surface of said light guide plate is one of said lateral sides thereof.

22. The backlight device according to claim 11 wherein a light diffusing area is provided on said light incident surface of said light guide plate for changing the directivity of said white light obtained on color mixing by said color mixing means of said illuminating device so that said white light is diffused along the in-plane direction of said light guide plate.

23. The backlight device according to claim 22 wherein said light diffusing area is formed by bonding a light diffusing sheet and a prism sheet in superposition on said light incident surface of said light guide plate.

24. The backlight device according to claim 22 wherein a reflecting area is provided in a region other than said light diffusing area on said light incident surface for reflecting the white light guided in said light guide plate so that said white light guided will not leak outward from said light guide plate.

25. The backlight device according to claim 24 wherein said reflecting area is fonned by bonding a reflective sheet in place.

26. A backlight device including a light guide plate guiding the light rays incident from a light incident surface of the light guide plate as said light rays undergo total reflection by a light radiating surface and a light reflecting surface as one and the other of the major surfaces of the light guide plate, said light guide surface radiating the light rays by in-plane light radiation from said light radiating surface, said backlight device comprising
  a plurality of illuminating devices provided at a preset interval on the light incident surface of said light guide plate, said illuminating devices each including
  a first light source for radiating light rays of a first prime color;
  a second light source for radiating light rays of a second prime color;
  a third light source for radiating light rays of a third prime color, said first, second, and third light sources being arrayed in the same plane;
  a fourth light source for radiating light rays of said third prime color;
  a first lens for refracting divergent light rays contained in said light rays of the first prime color radiated from said first light source;
  a second lens for refracting divergent light rays contained in said light rays of the second prime color radiated from said second light source;
  a third lens for refracting divergent light rays contained in said light rays of the third prime color radiated from said third light source;
  a fourth lens for refracting divergent light rays contained in said light rays of the third prime color radiated from said fourth light source;
  a first triangular prism having a first light reflecting surface for reflecting said light rays of the first prime color radiated from said first lens;
  a second triangular prism having a second light reflecting surface for reflecting said light rays of the second prime color radiated from said second lens;
  a first beam splitter prism including a first transniitting/reflecting surface and a second transmitting/reflecting surface, said first transmitting/reflecting surface reflecting linear polarized light oscillating in a first plane of oscillations of said light rays of the first prime color reflected by said first light reflecting surface, transmitting linear polarized light oscillating in a second plane of oscillations perpendicular to said first plane of oscillations, transmitting linear polarized light oscillating in said first plane of oscillations of said light rays of said third prime color radiated via said third lens, and transmitting linear polarized light oscillating in said second plane of oscillations;
  said second transmitting/reflecting surface transmitting said light rays of the first prime color, reflecting linear polarized light oscillating in said first plane of oscillations of said light rays of the second prime color, and transmitting linear polarized light oscillating in said first plane of oscillations of said light rays of the third prime color radiated via said third lens and linear polarized light oscillating in said second plane of oscillations; said first and second transmitting/reflecting surfaces being arranged for intersecting each other in the configuration of a letter X;
  a second beam splitter prism including a third transmitting/reflecting surface and a fourth transmitting/reflecting surface, said third transmitting/reflecting surface reflecting linear polarized light oscillating in a first plane of oscillations of said light rays of the second prime color reflected by said second light reflecting surface, transmitting linear polarized light oscillating in said second plane of oscillations, transmitting linear polarized light oscillating in said first plane of oscillations of said light rays of said third prime color radiated via said fourth lens and transmitting linear polarized light oscillating in said second plane of oscillations, said fourth transmitting/reflecting surface transmitting said light rays of the second prime color, reflecting linear polarized light oscillating in said first plane of oscillations of said light rays of the first prime color, and transmitting linear polarized light oscillating in said first plane of oscillations of said light rays of the third prime color radiated via said fourth lens and linear polarized light oscillating in said second plane of oscillations;
  said third and fourth transmitting/reflecting surfaces being arranged for intersecting each other in the configuration of a letter X; and
  a wavelength plate arranged between said first beam splitter prism and said second beam splitter prism for converting linear polarized light, oscillating in said second plane of oscillations of said light rays of the first prime color, transmitted through said first transmitting/reflecting surfhce, into linear polarized light oscillating in said first plane of oscillations, and for converting linear polarized light oscillating in said second plane of oscillations of said light rays of the second prime color transmitted through said third transmitting/reflecting surface into linear polarized light oscillating in said first plane of oscillations; said first beam splitter prism and said first triangular prism being arranged close to each other via an air layer, said second beani splitter prism and said second triangular prism being arranged close to each other via an air layer and said first beam splitter prism and said second beam splitter prism being arranged close to each other via said wavelength plate and an air layer;
  said first beam splitter prism mixing linear polarized light oscillating in respective first planes of oscillations of said light rays of the first and second prime colors and linear polarized light rays oscillating in said first plane of oscillations and said second plane of oscillations of said light rays of the third prime color to form white light, and radiating the so formed white light;

said second beam splitter prism mixing linear polarized light rays oscillating in respective first planes of oscillations of said light rays of the first and second prime colors and linear polarized light oscillating in said first plane of oscillations and said second plane of oscillations of said light rays of the third prime color to form white color, and radiating the so formed white color.

27. The backlight device according to claim 26 wherein the illuminating device further comprises an optical component operating so that, when light rays mixed into white light rays by said first beam splitter prism and the second beam splitter prism are incident on a light incident surface of said light guide plate, said white light is guided by said optical component so that the totality of said white light radiated from said first beam splitter prism and said second beam splitter prism will be incident on said light incident surface of said light guide plate.

28. The backlight device according to claim 27 wherein said optical component is an optical block including a white light incident surface of the same shape as light radiating surfaces of said first beam splitter prism and said second beam splitter prism, radiating the white light, said white light radiated from said light radiating surface being incident on said white light incident surface, a white light radiating surface arranged opposite to said white light incident surface and having at least one side of a length equal to the thickness of said light guide plate, and a pair of reflective surfaces arranged with a preset tilt with respect to the direction of thickness of said light guide plate and adapted for guiding said white light incident from said white light incident surface to said white light radiating surface as said white light undergoes total reflection.

29. The bacidight device according to claim 27 wherein said optical component is a pair of reflective mirrors arranged with a preset tilt with respect to the direction of thickness of the light guide plate and adapted for guiding the white light radiated from the light radiating surfaces of said first and second beam splitter prisms to said light incident surface of said light guide plate as said white light is reflected.

30. The backlight device according to claim 27 wherein said optical component is an optical block unit made up of a first optical block and a second optical block arrayed along the direction of thickness of said light guide plate;

said first optical block including a first white light incident surface on which is incident said white light radiated from light radiating surfaces of said first and second beam splitter prisms, a first white light radiating surface arranged opposite to said first white light incident surface and having at least one side of a length not larger than the thickness of said light guide plate, and a pair of first reflective surfaces arranged with a preset tilt with respect to the direction of thickness of said light guide plate and adapted for guiding said white light incident from said first white light incident surface to said first white light radiating surface as said white light undergoes total reflection;

said second optical block including a second white light incident surfhce on which is incident said white light radiated from said light radiating surfaces of said first and second beam splitter prisms, a second white light radiating surface arranged opposite to said white light incident surface and having at least one side of a length not larger than the thickness of said light guide plate, and a pair of second reflective surfaces arranged with a preset tilt with respect to the direction of thickness of said light guide plate and adapted for guiding said white light incident from said second white light incident surface to said second white light radiating surface as said white light undergoes total reflection; and wherein said white light incident surface of said optical blocks, formed by said first and second light incident surfaces, is of the same shape as said light radiating surfaces of said first and second beam splitter prisms; said first and second light radiating surfaces being arranged so as to be confined within said light incident surface of said light guide plate.

31. The backlight device according to claim 26 wherein said first lens, second lens, third lens and the fourth lens, possessed by said illuminating device, are spherical or aspherical lenses.

32. The backlight device according to claim 26 wherein said first lens, second lens, third lens and the fourth lens, possessed by said illuminating device, are provided with Fresnel lenses on light incident surfaces thereof.

33. The backlight device according to claim 26 wherein said first light source, second light source, third light source and the fourth lens, possessed by said illuminating device, are light emitting diodes (LEDs).

34. The backlight device according to claim 26 wherein said light incident surface of said light guide plate is a pair of opposite lateral sides thereof.

35. The backlight device according to claim 34 wherein, said light guide plate comprises a pair of opposite lateral sides of said light guide plate, as said light incident surfaces, the white light radiating surfaces of said plural illuminating devices arranged at said preset interval on one of said light incident surfaces and the white light radiating surfaces of said plural illuminating devices arranged at said preset interval on the other of said light incident surfaces are arranged with an offset of one half pitch, without facing one another, with said light guide plate in-between.

36. The backlight device according to claim 26 wherein said light incident surface of said light guide plate is one of lateral sides thereof.

37. The backlight device according to claim 26 wherein a light diffusing area for changing the directivity of said white light obtained on color mixing by said color mixing means of said illuminating device so that said white light is difftised along the in-plane direction of said light guide plate is provided on said light incident surface of said light guide plate.

38. The backlight device according to claim 37 wherein said light diffusing area is formed by bonding a light diffusing sheet and a prism sheet in superposition on said light incident surface of said light guide plate.

39. The backlight device according to claim 37 wherein a reflecting area for reflecting the white light guided in said light guide plate so that said white light guided will not leak outward from said light guide plate is provided in a region other than said light diffusing area on said light incident surface.

40. The backlight device according to claim 39 wherein said reflecting area is formed by bonding a reflective sheet in place.

41. A backlight device including a light guide plate guiding the light rays incident from a light incident surface of the light guide plate as said light rays undergo total reflection by a light radiating surface and a light reflecting surface as one and the other of the major surfaces of the light guide plate, said light guide surface radiating the light rays by in-plane light radiation from said light radiating surface, said backlight device comprising
- a plurality of illuminating devices provided at a preset interval on the light incident surface side of said light guide plate, said illuminating devices each including
- a first light source for radiating light rays of a first prime color;
- a second light source for radiating light rays of a second prime color and
- a third light source for radiating light rays of a third prime color, said first, second and third light sources being arrayed in the same plane;
- a first lens for refracting divergent light rays contained in said light rays of the first prime color radiated from said first light source;
- a second lens for refracting divergent light rays contained in said light rays of the second prime color radiated from said second light source;
- a third lens for refracting divergent light rays contained in said light rays of the third prime color radiated from said third light source;
- a first reflecting plate having a light reflecting surface for reflecting said light rays of the first prime color radiated via said first lens;
- a first beam splitter plate having a first wavelength selecting transmitting/reflecting surface which transmits light rays of the first prime color reflected by said light reflecting surface possessed by said first reflecting plate and which reflects said light rays of the second prime color radiated via said second lens;
- a second beam splitter plate having a second wavelength selecting transmitting/reflecting surface which transmits light rays of the third prime color radiated via said third lens and which reflects light rays of said first and second prime colors, radiated via said first beam splitter plate, said second beam splitter plate mixing the light rays of said first, second and third prime colors to form white light; and
- an optical plate having an angle selecting transmitting/ reflecting surface which reflects light rays incident thereon at an angle not less than a preset angle of incidence and which transmits light rays incident thereon at an angle less than said angle of incidence, said optical plate being arranged in rear of said second beam splitter plate so as to traverse an optical axis formed by said third lens and said second beam splitter plate, said optical plate radiating said white light obtained by color mixing by said second beam splitter plate.

42. The backlight device according to claim 41 further comprising
- an optical component operating so that, when light rays mixed into white light rays by said second beam splitter prism and radiated from said optical plate are incident on said light incident surface of said light guide plate, said white light radiated from said optical plate will be guided by said optical component so that the totality of said white light radiated from said optical plate will be incident on said light incident surface of said light guide plate.

43. The backlight device according to claim 42 wherein said optical component is an optical block includes a white light incident surface of the same shape as the light radiating surface of said optical plate radiating the white light, said white light radiated from said light radiating surface being incident on said white light incident surface of said light guide plate, a white light radiating surface arranged opposite to said white light incident surface and having at least one side of a length equal to the thickness of said light guide plate, and a pair of reflective surfaces arranged with a preset tilt with respect to the direction of thickness of said light guide plate and adapted for guiding said white light incident from said white light incident surface to said white light radiating surface as said white light undergoes total reflection.

44. The backlight device according to claim 42 wherein said optical component is a pair of reflective mirrors arranged with a preset tilt with respect to the direction of thickness of the light guide plate and adapted for guiding the white light radiated from the light radiating surface of said optical plate to said light incident surface of said light guide plate as said white light is reflected.

45. The backlight device according to claim 42 wherein said optical component is an optical block unit made up of a first optical block and a second optical block arrayed along the direction of thickness of said light guide plate;
- said first optical block including a first white light incident surffice on which is incident said white light radiated from the light radiating surface of said optical block, a first white light radiating surface arranged opposite to said first white light incident surface and having at least one side of a length not larger than the thickness of said light guide plate, and a pair of first reflective surfaces arranged with a preset tilt with respect to the direction of thickness of said light guide plate and adapted for guiding said white light incident from said first white light incident surface to said first white light radiating surface as said white light undergoes total reflection;
- said second optical block including a second white light incident surface on which is incident said white light radiated from said light radiating surface of said optical plate, a second white light radiating surface arranged opposite to said white light incident surface and having at least one side of a length not larger than the thickness of said light guide plate, and a pair of second reflective surfaces arranged with a preset tilt with respect to the direction of thickness of said light guide plate and adapted for guiding said white light incident from said second white light incident surface to said second white light radiating surface as said white light undergoes total reflection; and wherein
- a white light incident surface of said optical block, formed by said first and second white light incident surfaces, is of the same shape as said light radiating surface of said optical plate; said first and second white light radiating surfaces being arranged so as to be confined within said light incident surface of said light guide plate.

46. The backlight device according to claim 41 wherein said first lens, second lens, third lens and the fourth lens, possessed by said illuminating device, are spherical or aspherical lenses.

47. The backlight device according to claim 41 wherein said first lens, second lens, third lens and the fourth lens, possessed by said illuminating device, are provided with Fresnel lenses on light incident surfaces thereof.

48. The backlight device according to claim 41 wherein said illuminating device includes a second reflecting plate for reflecting said light rays of the first prime color, not incident on said first beam splitter plate, in a direction in which the light rays are incident on said first beam splitter plate, and a third reflecting plate for reflecting said light rays of the first prime color, not incident on said second beam splitter plate, in a direction in which the light rays are incident on said second beam splitter plate.

49. The backlight device according to claim 48 wherein said second reflecting plate has a reflecting surface reflecting said white light guided through said light guide plate into the bulk of the light guide plate so that said white light will not leak outward from said light guide plate.

50. The backlight device according to claim 41 wherein said first light source, second light source and the third light source, possessed by said illuminating device, are light emitting diodes (LEDs).

51. The backlight device according to claim 41 wherein said light incident surface of said light guide plate is a pair of opposite lateral sides thereof.

52. The backlight device according to claim 51 wherein, said light guide plate comprises a pair of opposite lateral sides of said light guide plate, as said light incident surfaces, the white light radiating surfaces of said plural illuminating devices arranged at said preset interval on one of said light incident surfaces and the white light radiating surfaces of said plural illuminating devices arranged at said preset interval on the other of said light incident surfaces are arrayed with an offset of one half pitch, without facing one another, with said light guide plate in-between.

53. The backlight device according to claim 41 wherein said light incident surface of said light guide plate is one of said paired lateral sides.

54. The backlight device according to claim 41 wherein a light diffusing area for changing the directivity of said white light obtained on color mixing by said second beam splitter of said illuminating device so that said white light will be diffused along the in-plane direction of said light guide plate is provided on said light incident surface of said light guide plate.

55. The backlight device according to claim 54 wherein said light diffusing area is formed by bonding a light diffusing sheet and a prism sheet in superposition on said light incident surface of said light guide plate.

56. The backlight device according to claim 54 wherein a reflecting area for reflecting the white light guided in said light guide plate so that said white light guided will not leak outward from said light guide plate is provided in a region other than said light diffusing area on said light incident surface.

57. The backlight device according to claim 56 wherein said reflecting area is formed by bonding a reflective sheet in place.

58. The backlight device according to claim 41 wherein said light diffusing area for diffusing the directivity of said white light, obtained by color mixing by said second beam splitter plate, in the in-plane direction of said guide plate is provided on a light radiating surface of said optical plate of said illuminating device, radiating said white light.

59. The backlight device according to claim 58 wherein said light diffusing area is formed by bonding a prism sheet on the light radiating surface of said optical plate radiating said white light.

60. The backlight device according to claim 41 wherein said first reflecting plate possessed by said illuminating device is a film on which there has been formed said light reflecting surface reflecting said light rays of the first prime color by vapor-depositing a reflective film in position.

* * * * *